United States Patent
Kilpatrick, II et al.

(10) Patent No.: US 9,474,000 B2
(45) Date of Patent: Oct. 18, 2016

(54) HANDOVER AND RESELECTION SEARCHING USING PREDICTIVE MOBILITY

(71) Applicant: QUALCOMM Incorporated, San Diego, CA (US)

(72) Inventors: Thomas Kilpatrick, II, San Diego, CA (US); Roy Franklin Quick, Jr., San Diego, CA (US); Olufunmilola Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/211,249

(22) Filed: Mar. 14, 2014

(65) Prior Publication Data

US 2015/0036663 A1 Feb. 5, 2015

Related U.S. Application Data

(63) Continuation-in-part of application No. 14/014,120, filed on Aug. 29, 2013.

(60) Provisional application No. 61/860,789, filed on Jul. 31, 2013.

(51) Int. Cl.
*H04W 4/00* (2009.01)
*H04W 36/24* (2009.01)
*H04W 36/00* (2009.01)

(52) U.S. Cl.
CPC ....... *H04W 36/245* (2013.01); *H04W 36/0083* (2013.01)

(58) Field of Classification Search
CPC .................................................. H04W 36/245
See application file for complete search history.

(56) References Cited

U.S. PATENT DOCUMENTS

| | | |
|---|---|---|
| 5,428,816 A | 6/1995 | Barnett et al. |
| 5,884,147 A | 3/1999 | Reudink et al. |
| 5,943,621 A | 8/1999 | Ho et al. |
| 6,909,893 B2 | 6/2005 | Aoki et al. |
| 7,224,973 B2 | 5/2007 | Tsutazawa et al. |

(Continued)

FOREIGN PATENT DOCUMENTS

| | | |
|---|---|---|
| EP | 1071304 A1 | 1/2001 |
| EP | 2214439 A1 | 8/2010 |

(Continued)

OTHER PUBLICATIONS

Zdenek Becvar et al. (Improvement of handover prediction in mobile WiMAX by using two thresholds, Czech Technical University in Prague, Faculty of electrical engineering, Department of telecommunication Engineering Nov. 10, 2011).*

(Continued)

*Primary Examiner* — Maharishi Khirodhar
(74) *Attorney, Agent, or Firm* — Holland & Hart LLP

(57) ABSTRACT

Methods, systems, and devices are described for managing wireless communications. In the methods, systems, and devices, historical information associated with mobility patterns of a mobile device may be accessed. A mobility parameter may be modified for at least one neighboring cell of a set of neighboring cells for measurement by the mobile device. The mobility parameter may be modified based on the historical information associated with the mobility patterns of the mobile device.

26 Claims, 19 Drawing Sheets

(56) References Cited

U.S. PATENT DOCUMENTS

| | | | |
|---|---|---|---|
| 7,912,490 | B2 | 3/2011 | Pietraski |
| 7,925,205 | B2 | 4/2011 | Kennedy, Jr. et al. |
| 7,929,979 | B2 | 4/2011 | Konno |
| 8,121,784 | B2 | 2/2012 | Templeton et al. |
| 8,134,970 | B2 | 3/2012 | Jalil et al. |
| 8,185,057 | B2 | 5/2012 | Molnar et al. |
| 8,185,159 | B2 | 5/2012 | Itamiya et al. |
| 8,208,473 | B2 | 6/2012 | Larsen et al. |
| 8,331,929 | B2 | 12/2012 | Brisebois et al. |
| 8,345,632 | B2 | 1/2013 | Mildh et al. |
| 8,472,982 | B1 | 6/2013 | Oroskar et al. |
| 8,537,751 | B2 | 9/2013 | Nylander et al. |
| 8,712,443 | B2 | 4/2014 | Konno |
| 9,008,063 | B2 | 4/2015 | Cui et al. |
| 9,084,181 | B2 | 7/2015 | Brisebois |
| 9,198,160 | B2 | 11/2015 | Bienas et al. |
| 9,226,197 | B2 | 12/2015 | Cui et al. |
| 2001/0006514 | A1* | 7/2001 | Park ............... H04W 36/12 370/331 |
| 2004/0017310 | A1 | 1/2004 | Vargas-Hurlston et al. |
| 2004/0085909 | A1 | 5/2004 | Soliman |
| 2004/0192341 | A1* | 9/2004 | Wang ............... H04W 28/26 455/456.1 |
| 2005/0255870 | A1 | 11/2005 | Chang et al. |
| 2005/0277415 | A1 | 12/2005 | Hamalainen et al. |
| 2005/0288019 | A1 | 12/2005 | Park et al. |
| 2006/0039318 | A1 | 2/2006 | Oh et al. |
| 2006/0227744 | A1 | 10/2006 | Metke et al. |
| 2007/0140157 | A1 | 6/2007 | Fu et al. |
| 2007/0142050 | A1* | 6/2007 | Handforth ............ H04W 36/32 455/436 |
| 2007/0149235 | A1 | 6/2007 | Chin et al. |
| 2007/0246045 | A1 | 10/2007 | Hoffman |
| 2008/0031194 | A1 | 2/2008 | Yaqub |
| 2008/0119209 | A1 | 5/2008 | Upp |
| 2008/0220784 | A1 | 9/2008 | Somasundaram et al. |
| 2008/0240030 | A1 | 10/2008 | Kolding et al. |
| 2009/0131066 | A1 | 5/2009 | Barve et al. |
| 2009/0232089 | A1 | 9/2009 | Lott |
| 2009/0268689 | A1 | 10/2009 | Fu et al. |
| 2009/0318199 | A1 | 12/2009 | Barreto et al. |
| 2010/0057485 | A1 | 3/2010 | Luft |
| 2010/0081455 | A1 | 4/2010 | Teasdale et al. |
| 2010/0267378 | A1 | 10/2010 | Hamabe et al. |
| 2010/0272050 | A1 | 10/2010 | Lim et al. |
| 2011/0124334 | A1 | 5/2011 | Brisebois et al. |
| 2011/0177819 | A1 | 7/2011 | Kitahara |
| 2011/0223965 | A1 | 9/2011 | Miklos et al. |
| 2011/0244859 | A1 | 10/2011 | Tsuda |
| 2012/0039305 | A1 | 2/2012 | Han et al. |
| 2012/0071173 | A1 | 3/2012 | Olsson et al. |
| 2012/0076056 | A1 | 3/2012 | Tillman et al. |
| 2012/0082198 | A1 | 4/2012 | Zhang et al. |
| 2012/0282925 | A1 | 11/2012 | Wehmeier et al. |
| 2012/0328059 | A1 | 12/2012 | Balraj et al. |
| 2013/0012189 | A1 | 1/2013 | Hamabe et al. |
| 2013/0030873 | A1 | 1/2013 | Davidson |
| 2013/0039194 | A1 | 2/2013 | Siomina et al. |
| 2013/0079010 | A1 | 3/2013 | Brisebois et al. |
| 2013/0107782 | A1 | 5/2013 | Anas et al. |
| 2013/0115998 | A1 | 5/2013 | Lamm et al. |
| 2013/0143617 | A1 | 6/2013 | Cea et al. |
| 2013/0155889 | A1 | 6/2013 | Brownworth et al. |
| 2013/0165120 | A1 | 6/2013 | Nylander et al. |
| 2013/0183971 | A1 | 7/2013 | Tamaki et al. |
| 2013/0195005 | A1 | 8/2013 | Al-Shalash |
| 2013/0222515 | A1 | 8/2013 | Abuan et al. |
| 2013/0225169 | A1 | 8/2013 | Farnsworth et al. |
| 2013/0231115 | A1 | 9/2013 | Lin |
| 2013/0231116 | A1 | 9/2013 | Mildh et al. |
| 2013/0237233 | A1 | 9/2013 | Radulescu et al. |
| 2013/0260745 | A1 | 10/2013 | Johansson et al. |
| 2013/0272268 | A1 | 10/2013 | Xu et al. |
| 2013/0288682 | A1 | 10/2013 | Wang et al. |
| 2013/0294380 | A1 | 11/2013 | Gazzard |
| 2013/0315094 | A1 | 11/2013 | Vannithamby et al. |
| 2013/0316706 | A1 | 11/2013 | Knauft |
| 2014/0057644 | A1 | 2/2014 | Chetlur et al. |
| 2014/0073303 | A1 | 3/2014 | Henderson et al. |
| 2014/0094178 | A1 | 4/2014 | Eskicioglu et al. |
| 2014/0148174 | A1 | 5/2014 | Teyeb et al. |
| 2014/0226559 | A1 | 8/2014 | Jactat et al. |
| 2015/0036598 | A1 | 2/2015 | Kilpatrick, II et al. |
| 2015/0038140 | A1 | 2/2015 | Kilpatrick, II et al. |
| 2015/0038143 | A1 | 2/2015 | Kilpatrick, II et al. |
| 2015/0038156 | A1 | 2/2015 | Kilpatrick, II et al. |
| 2015/0038180 | A1 | 2/2015 | Quick, Jr. et al. |
| 2015/0066557 | A1 | 3/2015 | Lichti |
| 2015/0163639 | A1 | 6/2015 | Kilpatrick, II et al. |
| 2015/0264534 | A1 | 9/2015 | Liu et al. |
| 2015/0289110 | A1 | 10/2015 | Kilpatrick, II et al. |
| 2015/0304891 | A1 | 10/2015 | Dinan |

FOREIGN PATENT DOCUMENTS

| | | |
|---|---|---|
| EP | 2320694 A1 | 5/2011 |
| EP | 2320702 A1 | 5/2011 |
| EP | 2525605 A1 | 11/2012 |
| EP | 2750457 A1 | 7/2014 |
| GB | 2449228 A | 11/2008 |
| GB | 2472595 A | 2/2011 |
| GB | 2472791 A | 2/2011 |
| WO | WO-9955110 A2 | 10/1999 |
| WO | WO-0033478 A1 | 6/2000 |
| WO | WO-2005064969 A1 | 7/2005 |
| WO | WO-2013029396 A1 | 3/2013 |
| WO | WO-2013050067 A1 | 4/2013 |
| WO | WO-2013107042 A1 | 7/2013 |
| WO | WO-2014012568 A1 | 1/2014 |

OTHER PUBLICATIONS

Jeong et al.(A smart handover decision Algorithm using location prediction for hierarchical Macro/Femto-cell networks, Sep. 5-8, 2011, IEEE).*

Chandra et al., "Determination of Optimal Handover Boundaries in a Cellular Network Based on Traffic Distribution Analysis of Mobile Measurement Reports," 1997 IEEE 47th Vehicular Technology Conference, May 4-7, 1997, Phoenix, AZ, pp. 305-309, vol. 1, ISBN 0-7803-3659-3, Institute of Electrical and Electronics Engineers.

Lyberopoulos et al., "Intelligent Paging Strategies for Third Generation Mobile Telecommunication Systems," IEEE Transactions on Vehicular Technology, Aug. 1995, pp. 543-554, vol. 44, issue 3, ISSN 0018-9545, Institute of Electrical and Electronics Engineers.

ISA/EPO, International Search Report and Written Opinion of the International Searching Authority, Int'l. App. No. PCT/US2014/047451, Nov. 6, 2014, European Patent Office, Rijswijk, NL, 13 pgs.

* cited by examiner

HANDOVER AND RESELECTION SEARCHING USING PREDICTIVE MOBILITY

CROSS-REFERENCE

The present application is a continuation-in-part and claims priority to U.S. patent application Ser. No. 14/014,120, filed Aug. 29, 2013, entitled "PREDICTIVE MOBILITY IN CELLULAR NETWORKS," the entire disclosure of which is incorporated herein by reference for all purposes. The present application also claims priority to U.S. Provisional Patent Application No. 61/860,789, filed Jul. 31, 2013, entitled "PREDICTIVE MOBILITY IN CELLULAR NETWORKS," the entire disclosure of which is incorporated herein by reference for all purposes.

BACKGROUND

The present description relates generally to wireless communication, and more specifically to adapting the behavior of mobile devices based on observed mobility trends. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, space and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

When a mobile device connected to a base station of a first cell moves out of the coverage area of the first cell, the first cell typically requests signal strength measurements for all neighboring cells of the mobile device for use in identifying a handover target candidate. These signal strength measurements and reports may consume power, thereby reducing the battery life of the mobile device. Additionally, these signal strength measurements and reports may introduce delays into the handover process, thereby increasing the likelihood that a call or connection is lost during the handover. In addition, significant signaling resources are used in communicating the measurement requests and reports between the base stations and the mobile device before and during the handover process. Generally, handover or reselection related measurements and reports may utilize generic or predefined mobility parameters that may not account for varying conditions as the mobile device changes location.

While a mobile device in idle mode (i.e. a mode where the device is camping on the cell and not actively communicating information with the base station) does not communicate measurements to the network, the mobile device may still monitor signal strength from neighboring cells so as to identify good candidates for reselection. This monitoring may consume a significant percentage of the mobile device's power consumption.

SUMMARY

The described features generally relate to one or more improved systems, methods, and/or apparatuses for predictive mobility in cellular networks. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

In a first set of illustrative examples, a method for managing wireless communications is provided. The method may include: accessing historical information associated with mobility patterns of a mobile device; and modifying a mobility parameter for at least one neighboring cell of a set of neighboring cells for measurement by the mobile device based on the historical information associated with mobility patterns of the mobile device. The mobility parameter may be a handover or reselection threshold associated with the at least one neighboring cell such that modifying the mobility parameter may include adjusting a value of the handover or reselection threshold. In some aspects, modifying the mobility parameter may include setting different handover or reselection thresholds for different ones of the neighboring cells based on the historical information associated with the mobility patterns of the mobile device.

In some aspects, the mobility parameter may be a search window size associated with a handover or a reselection such that modifying the mobility parameter may include adjusting the search window size based on the historical information. The mobility parameter may be a timing associated with the at least one neighboring cell such that modifying the mobility parameter may include adjusting the timing associated with the at least one neighboring cell based on the historical information. The mobility parameter may be a cell tracking area parameter such that modifying the mobility parameter may include restricting the measurement of the neighboring cells to a subset of a set of cell tracking areas associated with the neighboring cells based on the historical information.

In some aspects, the method may include selecting the at least one neighboring cell for measurement based on the modified mobility parameter. The method may be performed by a network entity, the mobile device, or a combination of the two. The method may include receiving the historical information from a server, the historical information may include a mobility parameter history for at least one serving cell of the mobile device. The historical information may include a mobility parameter history for the neighboring cells of the mobile device. The method may include collecting and storing the historical information at the mobile device over a predetermined period of time.

In some aspects, the method may include performing a handover or cell reselection of the mobile device to the at least one neighboring cell based on the modified mobility parameter. In some aspects, the method may include determining that a measured signal strength of a serving cell of the mobile device has dropped below a predetermined value, and refraining from performing a handover or cell reselection of the mobile device from the serving cell to the at least one neighboring cell based on the modified mobility parameters.

In a second illustrative set of examples, an apparatus for managing wireless communications is provided. The apparatus may include a processor and a memory in electronic communication with the processor. The memory may embody instructions being executable by the processor to: access historical information associated with mobility patterns of a mobile device; and modify a mobility parameter for at least one neighboring cell of a set of neighboring cells for measurement by the mobile device based on the historical information associated with mobility patterns of the mobile device.

In some aspects, the mobility parameter may be a handover or reselection threshold associated with the at least one neighboring cell such that the instructions to modify the mobility parameter may include instructions executable to adjust a value of the handover or reselection threshold. The instructions to modify the mobility parameter may be executable to set different handover or reselection thresholds for different ones of the neighboring cells based on the historical information associated with the mobility patterns of the mobile device.

In some aspects, the mobility parameter may be a search window size associated with a handover or a reselection such that the instructions to modify the mobility parameter may include instructions executable to adjust the search window size based on the historical information. The mobility parameter may be a timing associated with the at least one neighboring cell such that the instructions to modify the mobility parameter may include instructions executable to adjust the timing associated with the at least one neighboring cell based on the historical information. The mobility parameter may be a cell tracking area parameter such that the instructions to modify the mobility parameter may include instructions executable to restrict the measurement of the neighboring cells to a subset of a set of cell tracking areas associated with the neighboring cells based on the historical information.

In some aspects, the apparatus may include instructions executable to select the at least one neighboring cell for measurement based on the modified mobility parameter. The apparatus may be at least one of a network entity, the mobile device, or a combination of the two. The instructions may be executable to receive the historical information from a server, the historical information including a mobility parameter history for at least one serving cell of the mobile device. The historical information may include a mobility parameter history for the neighboring cells of the mobile device. The instructions may be executable to collect and store the historical information at the mobile device over a predetermined period of time.

In some aspects, the apparatus may include instructions executable to perform a handover or cell reselection of the mobile device to the at least one neighboring cell based on the modified mobility parameter. The apparatus may include instructions executable to determine that a measured signal strength of a serving cell of the mobile device has dropped below a predetermined value, and refrain from performing a handover or cell reselection of the mobile device from the serving cell to the at least one neighboring cell based on the modified mobility parameters.

In a third illustrative set of examples, an apparatus for managing wireless communications is provided. The apparatus may include: means for accessing historical information associated with mobility patterns of a mobile device, and means for modifying a mobility parameter for at least one neighboring cell of a set of neighboring cells for measurement by the mobile device based on the historical information associated with mobility patterns of the mobile device. The mobility parameter may be a handover or reselection threshold associated with the at least one neighboring cell such that the means for modifying the mobility parameter may include means for adjusting a value of the handover or reselection threshold. The means for modifying the mobility parameter may include means for setting different handover or reselection thresholds for different ones of the neighboring cells based on the historical information associated with the mobility patterns of the mobile device.

In some aspects, the mobility parameter may be a search window size associated with a handover or a reselection such that the means for modifying the mobility parameter may include means for adjusting the search window size based on the historical information. The mobility parameter may be a timing associated with the at least one neighboring cell such that the means for modifying the mobility parameter may include means for adjusting the timing associated with the at least one neighboring cell based on the historical information. The mobility parameter may be a cell tracking area parameter such that the means for modifying the mobility parameter may include means for restricting the measurement of the neighboring cells to a subset of a set of cell tracking areas associated with the neighboring cells based on the historical information.

In some aspects, the apparatus may include means for selecting the at least one neighboring cell for measurement based on the modified mobility parameter. The apparatus may be at least one of a network entity, the mobile device, or a combination of the two. The apparatus may include means for receiving a historical information from a server, the historical information including a mobility parameter history for at least one serving cell of the mobile device. The historical information may include a mobility parameter history for the neighboring cells of the mobile device. The apparatus may include means for collecting and storing the historical information at the mobile device over a predetermined period of time.

In some aspects, the apparatus may include means for performing a handover or cell reselection of the mobile device to the at least one neighboring cell based on the modified mobility parameter. The apparatus may include means for determining that a measured signal strength of a serving cell of the mobile device has dropped below a predetermined value, and means for refraining from performing a handover or cell reselection of the mobile device from the serving cell to the at least one neighboring cell based on the modified mobility parameters.

In a fourth illustrative set of examples, a computer program product for managing wireless communications is provided. The computer program product may include a non-transitory computer-readable storage medium including instructions executable by a processor. The instructions may be executable by the processor to: access historical information associated with mobility patterns of a mobile device; and modify a mobility parameter for at least one neighboring cell of a set of neighboring cells for measurement by the mobile device based on the historical information associated with mobility patterns of the mobile device.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
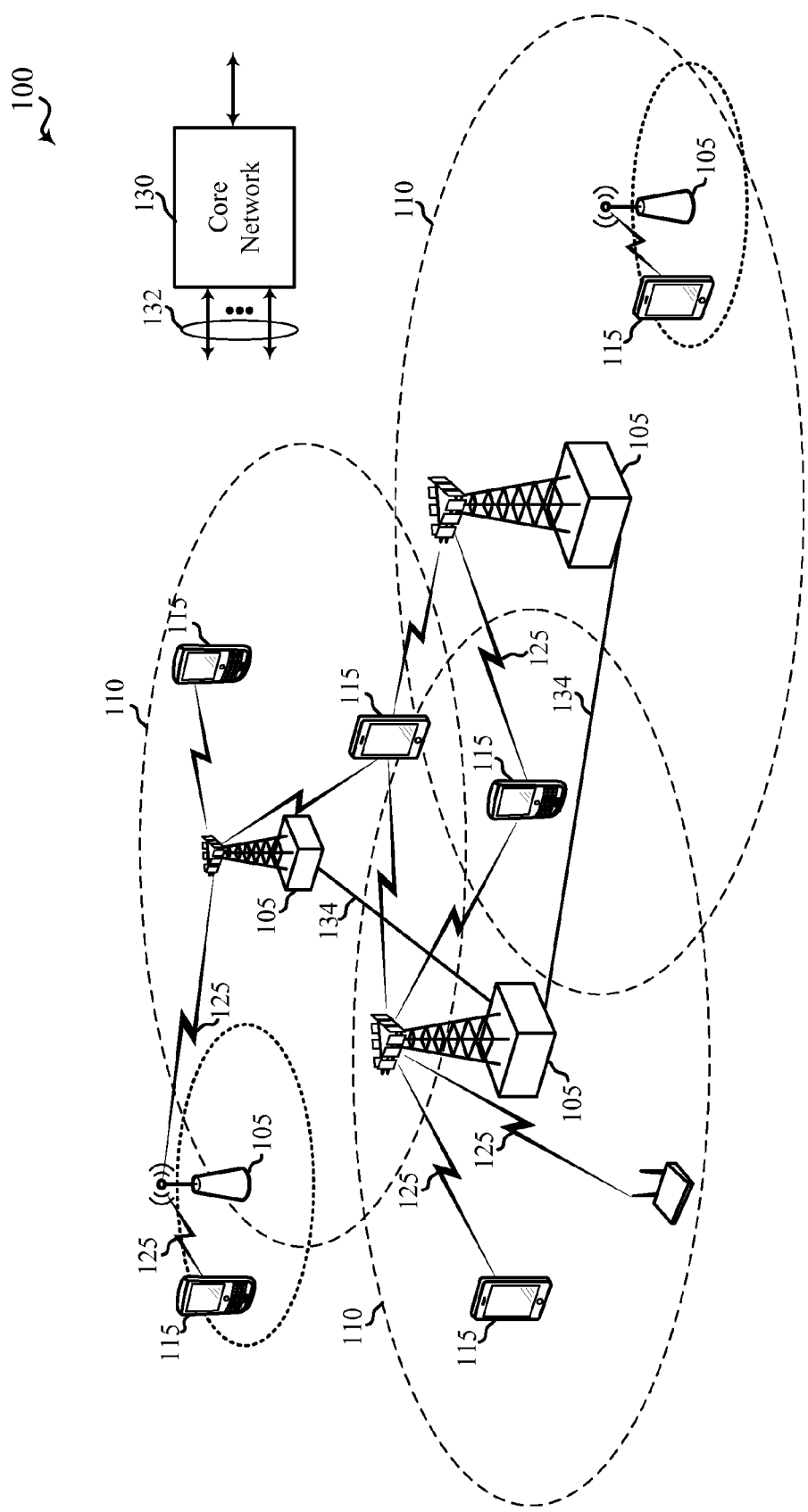
FIG. 1 shows a block diagram of a wireless communications system, according to one aspect of the principles described herein.

Methods, systems, and devices are provided that may be used to improve network and/or mobile device performance based on learning and predicting the behavior of a mobile device (e.g., mobile phone, laptop, tablet, etc.) user. For a mobile device user, for example, using predictive behavior may involve identifying a subset of one or more neighboring cells for measurement by the mobile device using historical information associated with mobility patterns of the mobile device. In some aspects, the historical information as well as the current state or location of the mobile device may be used to modify one or more of the parameters or algorithms associated with measuring at least one of the set of serving or neighboring cells for handover or cell reselection. These measurements may then be used to hand off the mobile device to the identified (i.e., predicted) cell as part of a handover or a cell reselection, for example.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

FIG. 1 is a block diagram conceptually illustrating an example of a wireless communications system 100, in accordance with an aspect of the present disclosure. The wireless communications system 100 includes base stations (or cells) 105, mobile devices 115, and a core network 130. The base stations 105 may communicate with the mobile devices 115 under the control of a base station controller (not shown), which may be part of the core network 130 or the base stations 105 in various embodiments. Base stations 105 may communicate control information and/or user data with the core network 130 through backhaul links 132. In certain embodiments, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the mobile devices 115 via one or more base station antennas. Each of the base stations 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). There may be overlapping coverage areas for different technologies.

In certain embodiments, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each eNodeB may provide communication coverage for a macro cell, a pico cell, a femto cell, and/or other types of cell. A macro cell generally covers a relatively large coverage area (e.g., several kilometers in radius) and may allow unrestricted access by mobile devices 115 with service subscriptions with the network provider. A pico cell would generally cover a relatively smaller coverage area (e.g., buildings) and may allow unrestricted access by mobile devices 115 with service subscriptions with the network provider. A femto cell would also generally cover a relatively small coverage area (e.g., a home) and, in addition to unrestricted access, may also provide restricted access by mobile devices 115 having an association with the femto cell (e.g., mobile devices 115 in a closed subscriber group (CSG), mobile devices 115 for users in the home, and the like). In such examples, a base station 105 for a macro cell may be referred to as a macro eNodeB, a base station 105 for a pico cell may be referred to as a pico eNodeB, and a base station 105 for a femto cell may be referred to as a femto eNodeB or a home eNodeB. A base station 105 may support one or multiple (e.g., two, three, four, and the like) cells.

The core network 130 may communicate with the base stations 105 via a backhaul link 132 (e.g., S1 interface, etc.). The base stations 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The mobile devices 115 may be dispersed throughout the wireless communications system 100, and each mobile device 115 may be stationary or mobile. A mobile device 115 may also be referred to by those skilled in the art as a user equipment (UE), mobile station, a subscriber station, a mobile unit, a subscriber unit, a wireless unit, a remote unit, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like.

The communication links 125 shown in the wireless communications system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

Mobile device 115 users typically have predictable behavior, often doing the same things or going to the same places at about the same time each day. One example is the travel pattern and schedule of a mobile device 115 user going to and from work. The user may typically leave home at a certain time, travel certain roads to get to work, stay at work until it is time to go back home using the same roads as before, and then repeat more or less the same routine the next day. Because the movements of mobile device 115 user in such a scenario can be foreseeable, it may be possible to predict with a high degree of confidence which cells are used by the mobile device 115 at particular times when going to work, when returning home at the end of the day, or even when taking a lunch break. This prediction may be based on previous measurements, cell reselections (e.g., when the mobile device 115 is in idle mode), and/or handovers, which were performed by the mobile device 115 during the user's commute. Moreover, the use of predictive behavior may also apply to other devices such as laptops, tablets, pads, machine-to-machine (M2M) devices, and the like.

The ability to learn and predict the behavior of the mobile device 115 user may not only be used to reduce the signaling that is needed on the network side, but may also be used to reduce the (usually large) number of measurements of neighboring cells made by the mobile device 115 to determine a suitable cell for handover. Further, various mobility parameters associated with the handover or cell reselection measurements may be changed or otherwise modified based on the predictive behavior of the mobile device 115. Reducing the number of measurements (and related reporting messaging) and/or modifying the mobility parameters associated with the measurements may have the benefit of extending the battery life of the mobile device 115. In dense urban areas, for example, where large numbers of small cells and/or WiFi hot spots are deployed, predicting the mobile device 115 mobility (e.g., pattern and schedule) may have an impact on the performance of both the network and the mobile device 115.

In addition to the commuting example described above, there may be other instances in which the behavior of the mobile device 115 user may be leveraged to predict cells and reduce network signaling and/or mobile device 115 measurements. One example is when "airplane mode" is turned off after the user arrives at her destination. When such a trip is routine and the behavior predictable, the mobile device 115 may start by identifying a cell at the place of arrival instead of looking (unsuccessfully) for cells at the place of departure as it would typically do.

In yet another example of predictive behavior, when a cell that is typically used by a mobile device during the user's commute to work is congested, the network may look at other cells and may use predictive techniques and the loading levels on the other cells to identify a suitable cell for handover (or cell reselection when the mobile device 115 is in idle mode, e.g., camping on the network). Moreover, when the network knows that the mobile device 115 is going to use a particular cell at a certain time it may try to schedule appropriate resources to be available for the mobile device 115.

In still other examples of predictive behavior, the mobile device 115 may selectively enable or disable one or more air interfaces based on the historical information and/or a current location of the mobile device. In certain examples, the mobile device 115 may disable all air interfaces (e.g., enter airplane mode) when the mobile device 115 follows a known path to a certain location (e.g., the airport) in accordance with historical patterns. Additionally or alternatively, a mobile device 115 with a multi-mode modem may selectively disable specific air interfaces (e.g., a WLAN/WiFi interface, an LTE interface, a 1x/EV-DO interface, etc.) based on the historical information and a current location of the mobile device 115.

Generally, predictive mobility in wireless networks may be used to alleviate network signaling demands, to reduce mobile device 115 measurements to extend battery life, to change measurements by the mobile device 115 to optimize the handover or cell reselection process, and/or to allocate networking resources more effectively, for example.

Figure 2:
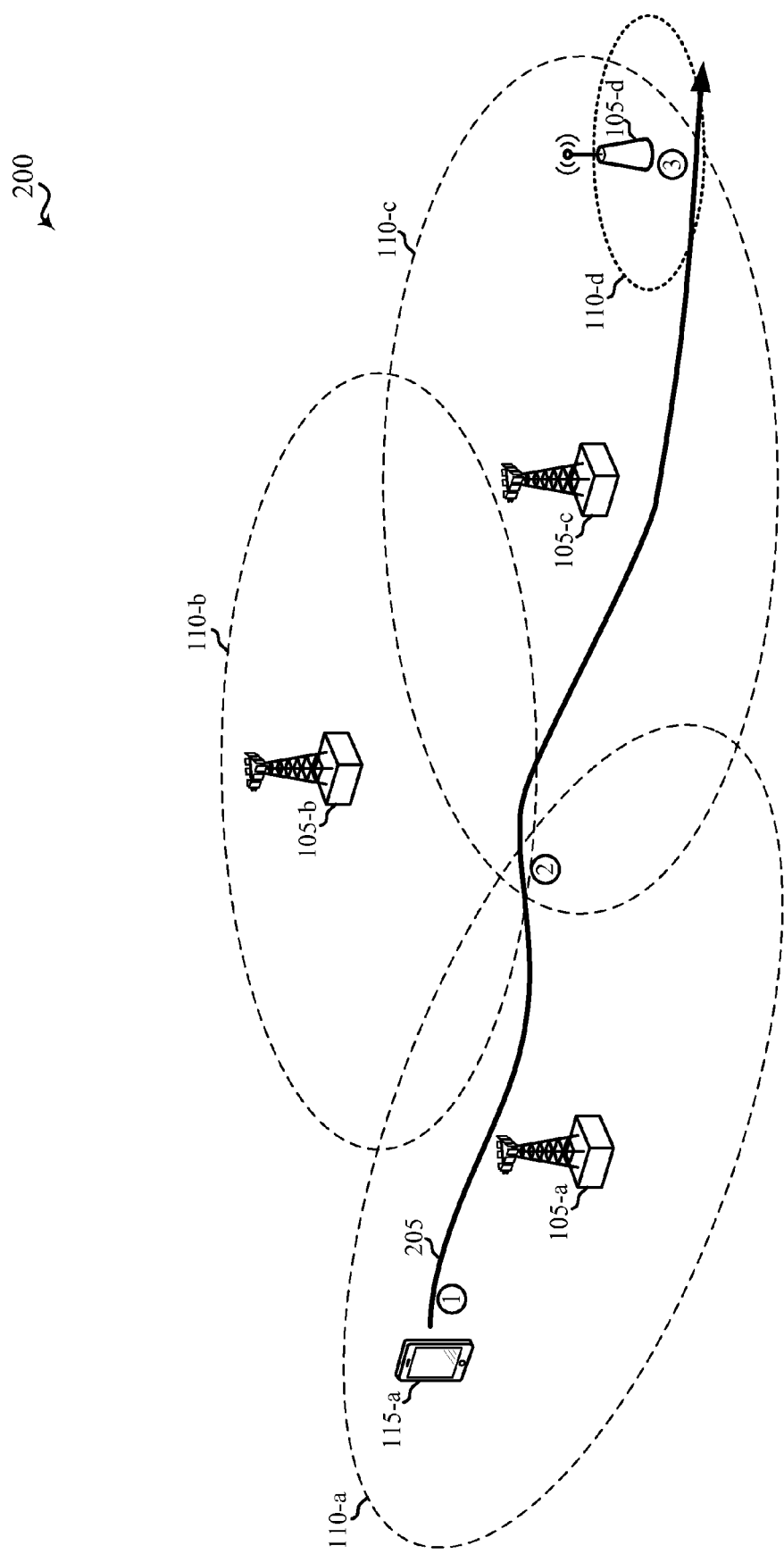
FIG. 2 shows a diagram of an example of device mobility in a wireless communications system, according to one aspect of the principles described herein.

FIG. 2 shows a diagram of a simplified example of device mobility in a wireless communications system 200, according to one aspect of the principles described herein. In the wireless communications system 200 of FIG. 2, a mobile device 115-a travels along a path 205 through the coverage areas 110-a, 110-b, 110-c, 110-d of a first base station 105-a, a second base station 105-b, a third base station 105-c, and a fourth base station 105-d, respectively. The mobile device 115-a may be an example of one or more of the mobile devices 115 of FIG. 1. Similarly, the base stations 105 of FIG. 2 may be examples of one or more of the base stations 105 of FIG. 1.

Each base station 105 may represent an actual or potential serving cell for the mobile device 115-a. In the present example, the mobile device 115-a may begin at position 1 with the first base station 105-a as the serving cell, then move through the coverage area 110-a of the first base station 105-a to position 2. At position 2, the mobile device 115-a may be located at the outer reaches of the coverage area 110-a of the first base station 105-a and enter an intersection of the coverage areas 110-a, 110-b, 110-c of the first, second, and third base stations 105-a, 105-b, 105-c. At position 2, the mobile device 115-a may report a signal strength measurement of the first base station 105-a, the current serving cell, to the first base station 105-a.

In conventional systems, if the mobile device 115-a is in connected mode with the first base station 105-a, the signal strength measurement of the first base station 105-a may indicate that the mobile device 115-a is exiting the coverage area 110-a of the first base station 105-a and trigger preparations for a handover of the mobile device 115-a from the first base station 105-a to a new serving cell base station. Accordingly, the first base station 105-a may instruct the mobile device 115-a to measure the signal strengths of neighboring base stations to identify a handover candidate for the mobile device 115-a. The mobile device 115-a may identify the neighboring base stations 105-b, 105-c using a stored neighboring cell list (NCL) and/or by scanning for the neighboring base stations 105-b, 105-c. If the mobile device 115-a is in idle mode, the mobile device 115-a may measure neighboring cells to identify a reselection target based on a pre-defined threshold for the serving cell signal strength, as configured by the carrier.

The mobile device 115-a may transmit signal strength measurements to the serving base station 105-a, and the serving base station 105-a may select either the second base station 105-b or the third base station 105-c as the handover target base station for the mobile device 115-a based on the signal strength measurements. If the second base station 105-b is selected as the handover target, the mobile device 115-a might briefly handover to the second base station 105-b, and then perform an additional handover to the third base station 105-c as the mobile device 115-a moves out of the coverage area 110-b of the second base station 105-b. In certain examples, upon arriving at position 3, the mobile device 115-a may be handed over to the fourth base station 105-d (e.g., a femtocell or picocell) before returning to the third base station 105-c.

In such systems, it may be difficult for the current serving cell and the mobile device 115-a to determine the optimal time to perform a handover, and the most appropriate handover target. For example, at position 2, a more efficient transition may be for the mobile device 115-a to bypass the second base station 105-b and move directly from the first base station 105-a to the third base station 105-c. Similarly, when the mobile device 115-a is at position 3, the signal strength of the fourth base station 105-d may be stronger than that of the third base station 105-c for a short amount of time, but as the mobile device 115-a is moving along the path 205 (e.g., in a train or automobile), the mobile device 115-a may spend a small amount of time in the coverage area 110-d of the fourth base station 105-d, thereby triggering another handover in short order. In certain examples, the mobile device 115-a may exit the coverage area 110-d of the fourth base station 105-d before there is an opportunity to complete a handover to the next serving cell, which may result in a dropped call or interrupted data connectivity. Thus, it may be more efficient to refrain from handing the mobile device 115-a over to the fourth base station 105-d when it can be determined that the mobile device 115-a is traveling along the path 205.

To address these and other issues, the present description provides methods, systems, and devices that may be used to improve network and/or mobile device 115-a performance based on learning and predicting the behavior of the mobile device 115-a. Using predictive behavior may involve identifying a neighboring cell for measurement by using historical information associated with mobility patterns of the mobile device 115-a. The predicted behavior of the mobile device 115-a may be used to modify mobility parameters (e.g., the reporting values and handover or reselection thresholds) associated with the measurements to further improve performance. These measurements may then be used to hand off the mobile device 115-a to the identified (i.e., predicted) cell as part of a handover or a cell reselection, for example.

In the example of FIG. 2, for example, the mobile device 115-a may regularly travel along path 205 at regular intervals, times of day, and at consistent speeds. This behavior may be tracked and stored at the mobile device 115-*a*, a network server, and/or one or more of the base stations 105. Based on the historical information, the mobile device 115-*a* and/or a current serving base station can predict a next location of the mobile device 115-*a*, using the predicted next location to inform the selection of handover and reselection targets. For example, when the mobile device 115-*a* approaches position 2, the first base station 105-*a* may determine, from the current location and speed of the mobile device 115-*a* in relation to stored historic data related to mobility patterns of the mobile device 115-*a*, that the mobile device 115-*a* is likely traveling along path 205.

Accordingly, the first base station 105-*a* may determine that the mobile device 115-*a* is moving more into the coverage area of the third base station 105-*c* than the second base station 105-*b*. Based on a level of confidence in that prediction, the base station 105-*a* may instruct the mobile device 115-*a* to only measure the signal strength of the third base station 105-*c* (i.e., rather than all neighboring base stations 105) and, if the signal strength of the third base station 105-*c* is satisfactory, select the third base station 105-*c* as the handover target without considering other neighboring base stations 105 as possible handover targets.

In one aspect, based on the level of confidence in that prediction, the base station 105-*a* may modify (or instruct the mobile device 115-*a* to modify) the mobility parameters associated with the handover or reselection measurements. For example, using the historical information associated with the mobility patterns of the mobile device 115-*a*, the first base station 105-*a* may determine that position 2 corresponds to a location where the measured signal strength of the first base station 105-*a* is lower than a level normally associated with continued service and, also, that the signal strength of the third base station 105-*c* at position 2 is lower than a handover threshold value. Accordingly, the first base station 105-*a* may modify the mobility parameter associated with reporting the signal strength measurement of the first base station 105-*a* and/or the third base station 105-*c* to avoid performing a handover to the second base station 105-*b*.

In one example, the first base station 105-*a* may lower the reporting level for the signal strength measurements for the first base station 105-*a* to permit the mobile device 115-*a* to refrain from performing a handover or reselection until it has continued along the path 205 a sufficient distance to perform a successful handover to the third base station 105-*c*. Additionally or alternatively, the first base station 105-*a* may lower the reporting level for the signal strength measurements for the third base station 105-*c* to permit the mobile device 115-*a* to perform a handover or reselection to the third base station 105-*c* with confidence that the signal strength will continue to increase as the mobile device 115-*a* travels along the path 205. Accordingly, the present disclosure may permit the mobile device 115-*a* to stay attached to the first base station 105-*a* for a longer period and/or attach to the third base station 105-*c* earlier than typically allowed. As such, the mobile device 115-*a* may avoid performing a handover or reselection to the second base station 105-*b*.

In other aspects, when the mobile device 115-*a* approaches position 3 at the fringes of the coverage area 110-*c* of the third base station 105-*c*, the third base station 105-*c* and/or mobile device 115-*a* may determine, based on the historic data related to the mobility patterns of the mobile device 115-*a*, that the mobile device 115-*a* is likely on the known path 205. Accordingly, the third base station 105-*c* and/or mobile device 115-*a* may determine that the fourth base station 105-*d* is an inappropriate handover target for the mobile device 115-*a*. This determination may be based on the prediction that the mobile device 115-*a* will continue along path 205, the current speed of the mobile device 115-*a*, and the known cell edge signal strength of the coverage area 110-*d* of the fourth base station 105-*d*. Accordingly, the third base station 105-*c* and/or the mobile device 115-*a* may choose to exclude the fourth base station 105-*d* from signal strength measurements made at the mobile device 115-*a* to select a handover target. Alternatively, mobility parameters associated with measuring the signal strength of the fourth base station 105-*d* may be modified such that the fourth base station 105-*d* would not be considered a suitable candidate for handover or reselection.

Figure 3A:
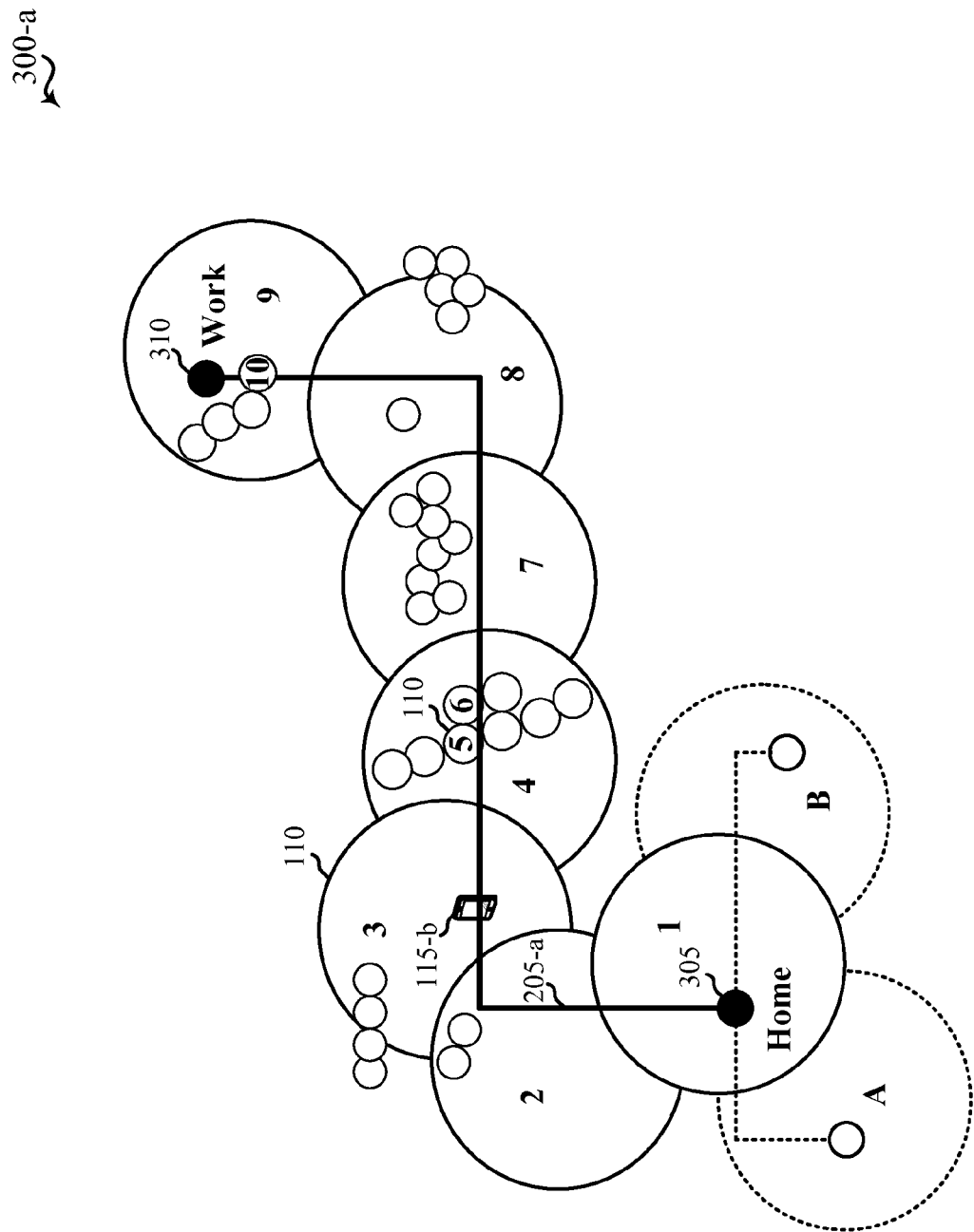
FIGS. 3A-3C show a diagrams of other examples of device mobility in a wireless communications system, according to one aspect of the principles described herein.
Figure 3B:
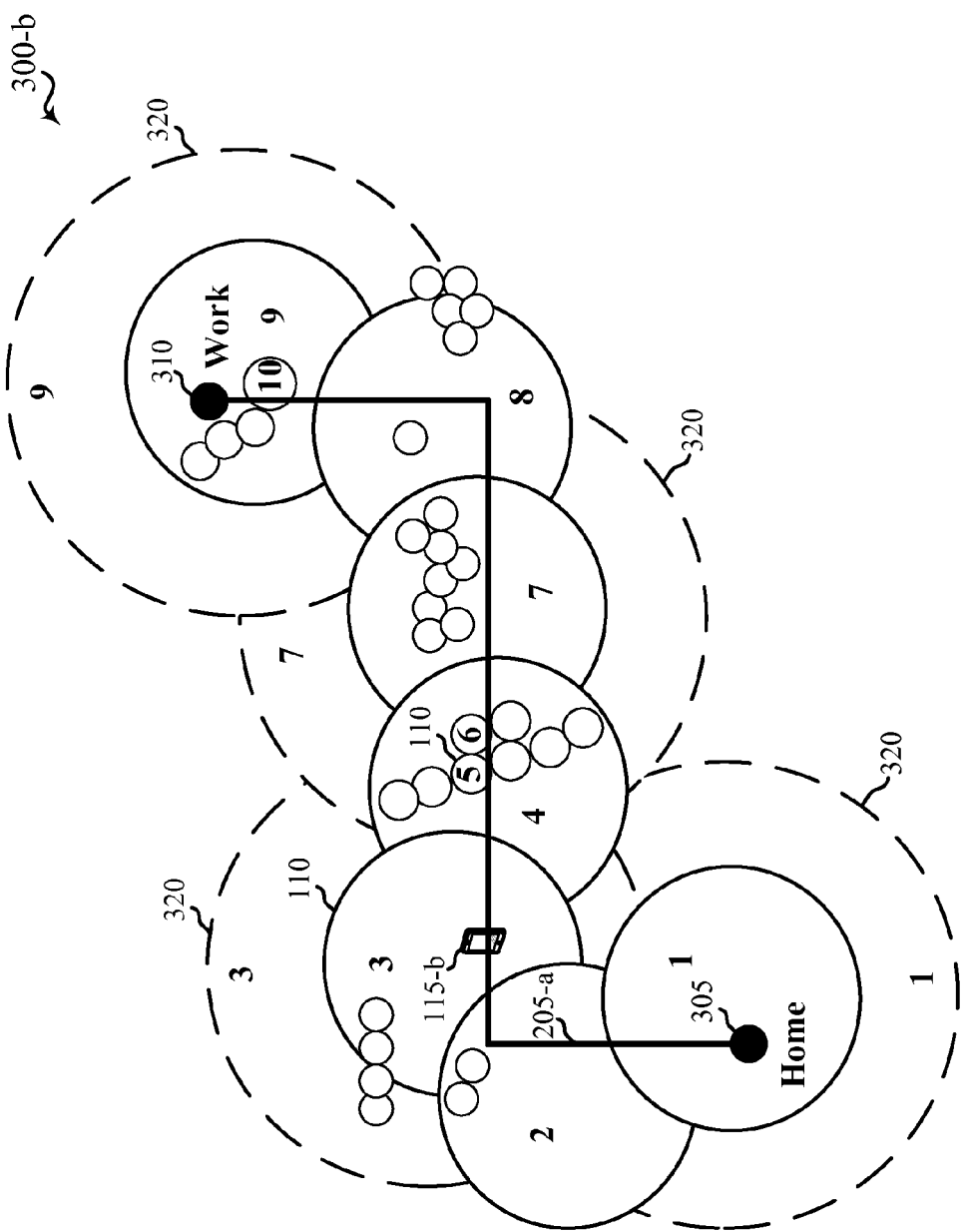
Figure 3C:
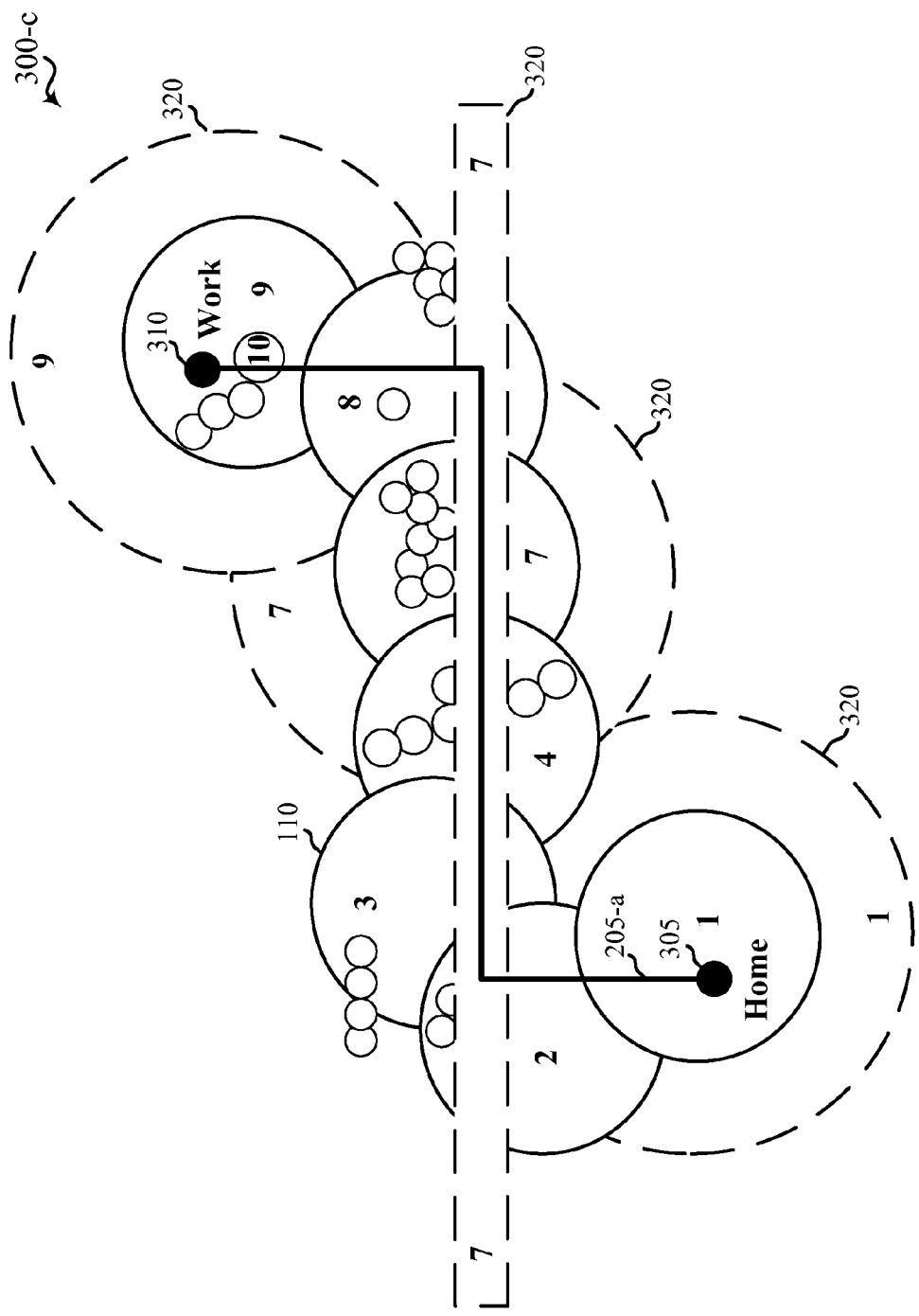

FIGS. 3A-3C show diagrams examples of device mobility in a wireless communications system 300, according to aspects of the principles described herein. Specifically, FIGS. 3A-3C illustrate an illustrative path 205-*a* of a mobile device 115-*b* between a home location 305 and a work location 310. The path 205-*a* may traverse the coverage areas 110 of a number of large cells and small cells.

When behavioral information is not considered, the user may travel from the home location 305 to the work location 310 along the depicted path 205-*a* in a normal manner. For example, when the current serving cell signal strength measurement drops, the mobile device 115-*b* may notify the network, which in turn may provide a neighboring cell list (NCL) for the mobile device 115-*b* to take measurements and report the strongest cell.

Referring specifically to FIG. 3A, after the signal strength drops in cell 1, the mobile device 115-*b* may find cell 2 the strongest and the network may ask the mobile device 115-*b* to hand-off to cell 2. The same process may take place with cells 3, 4, 5, 6, 7, 8, 9, and 10 until the user reaches the work location 310. Before each handover, however, the mobile device 115-*b* may make measurements of all the neighboring cells requested by the network even though the same handful of cells is used each day. Moreover, the mobile device 115-*b* may traverse clusters of femtocells or other small cells (e.g., cells 5, 6, and 10) having small cell radiuses along the path 205-*a*, which may result in a ping pong effect in which the mobile device 115-*b* is repeatedly handed over to or from the same set of one or more cells. To overcome these inefficiencies, predictive behavior of the mobile device 115-*b* may be leveraged in a number of ways.

According to a first approach, a predictive algorithm application may reside on the mobile device 115-*b*. Mobile device profile information (i.e., based on collected historical information associated with mobility patterns of the mobile device) may be stored by the mobile device 115-*b* for use by the predictive algorithm application. Over a certain learning period (e.g., twenty days), enough information (e.g., location, time, speed, cell measurements, etc.) may be collected by the mobile device 115-*b* to predict with a high degree of confidence where the mobile device 115 will be on a certain day and time. Alternatively, a network entity (e.g., measurement server) may collect and store the profile information of the mobile device 115-*b*, and the predictive algorithm application of the mobile device 115-*b* may communicate with the network entity to access the mobile device profile information.

When the signal strength drops in cell 1 of FIG. 3A, the predictive algorithm application may identify with a high degree of confidence (e.g., >90%) that the mobile device 115-*b* is moving along a known path 205-*a* and that the next cell along the path 205-*a* to the work location 310 is cell 2. The network, not aware of the mobile device 115-*b* behavior, may instruct the mobile device 115-*b* to make measurements of all neighboring cells in a NCL.

Because of the high degree of confidence that cell 2 is the next cell, the mobile device 115-*b* may only measure cell 2 and report the measurements of cell 2 to the network before proceeding with a handover to cell 2. Alternatively, the mobile device 115-*b* may make measurements on a reduced subset of neighboring cells (e.g., a ranked reduced set) found in the NCL. In certain examples, the profile information for the mobile device 115-*b* may include a history of neighboring cells (e.g., both serving cells and non-serving cells along the path 205-*a*) for the mobile device 115-*b*, and the reduced subset of the neighboring cells may be identified based on the history of neighboring cells.

In addition to identifying the reduced subset of the neighboring cells for measurement by the mobile device 115-*b*, the mobile device 115-*b* may also select a frequency with which the measurements are made and/or a type of measurement to perform based on the profile information. The types of measurements taken by the mobile device 115-*b* and determined by the profile information may include serving and neighboring cell radio frequency (RF) measurements, including carrier frequencies, physical cell IDs, location, signal strength measurements (e.g., RSCP, RSRQ, RSRP), time measurements, and the like.

Additionally or alternatively, various mobility parameters associated with the measurements to perform may also be modified based on the profile information. For instance, the mobile device 115-*b* may change (e.g., raise or lower) a reporting level associated with the measurements. In one example, the mobile device 115-*b* may adjust a handover or reselection threshold measurement level associated with at least one of the neighbor cells to prevent a short duration handover or reselection. In some aspects, the mobile device 115-*b* may set different handover or reselection thresholds for different ones of the neighboring cells based on the profile information (e.g., the historical information associated with the mobility patterns of the mobile device 115-*b*). For example, the mobile device 115-*b* may lower a threshold value for reference signal measurements for a preferred handover base station and raise the threshold value for a base station known to be associated with short duration handovers or unreliable service. In another example, the mobile device 115-*b* may adjust (e.g., reduce, extend forward or backward, move in time, etc.) a search window for performing the measurements based on the profile information. In yet another example, the mobile device 115-*b* may adjust a timing parameter associated with one or more of the neighboring cells for handover or reselection measurements based on the historical information.

Fewer cells to measure and/or improved measurement results based on modified mobility parameters may result in simplified signaling and increased battery life for the mobile device 115-*b*. In the event the mobile device 115-*b* does not find the predicted next cell and/or the reduced set of cells, the mobile device 115-*b* and/or network may fall back to the conventional operation of measuring the full set of neighboring cells. In certain examples, the predicted next cell and/or reduced set of cells may not be found during only a single event, a short period of time, or a deviation from the route. Once the mobile device 115-*b* and/or network confirms that the mobile device 115-*b* is back on the known path 205-*a*, the practice of measuring reduced sets of neighboring cells along the predictive route may continue.

In a different scenario, the mobile device 115-*b* may be attached to serving cell 1, and the predictive algorithm may determine a confidence level of 60% that cell 2 is the next cell, a confidence level of 20% that cell A is the next cell, and a confidence level of 20% that cell B is the next cell, the mobile device 115-*b* may elect to make measurements on cell 2, cell A, and cell B as possible handover targets. If cell A or B is the strongest, the mobile device 115-*b* may operate in its usual mode without taking behavioral information into account. If cell 2 is the strongest, predictive behavior may be used when selecting cells along the path 205-*a*.

In certain examples, the mobile device 115-*b* may recognize, based on a prediction that the mobile device 115-*b* will remain on the path 205-*a*, that certain handovers along the path may be unnecessary. For example, as the mobile device 115-*b* travels within cell 4, the mobile device 115-*a* may travel through the coverage areas of cell 5 and cell 6, which may be femtocells. Nevertheless, the mobile device 115-*b* may determine that handing over to one or more of these femtocells may result in a ping pong effect, a dropped call, or other loss of connectivity due to the small cell radiuses of the femtocells and an estimated amount of time the mobile device 115-*b* will be in each femtocell. Thus, based on the historical information and current status of the mobile device 115-*b*, the mobile device 115-*b* may exclude cell 5 and cell 6 from an identified subset of neighboring cells for which signal strength measurements are to be performed. This decision may result in the mobile device 115-*b* avoiding handovers to the femtocells while the mobile device 115-*b* travels along the path 205-*a*.

In certain examples, where the mobile device 115-*b* is measuring and storing the signal strength for each cell, the mobile device 115-*b* may have the ability to create a mean and standard deviation for the signal strength of each cell. The mean and standard deviation values for each cell may allow the mobile device 115-*b* to remain on a cell or move forward with a hand-over to a target cell when the signal strength of the serving cell is lower than expected. For example, the path 205-*a* may include a train crossing that occasionally delays travel along the path 205-*a*. The mobile device 115-*b* may store or have access to 20 days of historical route information, and during these 20 days a train may have delayed the travel of the mobile device 115-*b* along the path 205-*a* 10 times. The train may pass between the mobile device 115-*b* and the serving cell during this delay, causing the signal strength of the serving cell to drop significantly, even though the mobile device 115-*b* remains on the predicted path 205-*a*.

By tracking historical mean and standard deviation values for the serving cell's signal strength, the predictive algorithm application residing on the network and/or the mobile device 115-*b* may identify that the drop in signal strength is a regular and expected occurrence, thereby allowing the mobile device 115-*b* to remain connected to the serving cell. In certain examples, the mean and standard deviation values for the signal strength of a particular cell may be used to calculate a quality metric associated with that particular cell for use in handover and reselection decisions.

According to a second approach, the predictive behavior of the mobile device 115-*b* may be stored in a network entity (e.g., measurement server) and may be accessed by a predictive algorithm in the network to optimize cell measurements and handover procedures. One way in which behavior information may be collected is by tracking the electronic serial number (ESN) or the international subscriber identity (IMSI) through base stations (e.g., NB/eNBs), mobility management entities (MMES), or other network devices. Over the learning period profile information may be collected by the network based on the observed behavior of the mobile device 115-*b*. The profile information may be used to predict with a high degree of confidence where a particular mobile device 115 will be on a certain day and time.

When the signal strength of a serving cell drops, the predictive algorithm residing on the network may identify with a high degree of confidence (e.g., >90%) the next cell in the path 205-*a*. The network, instead of providing a full NCL (which may include up to 32 cells for measurements, for example), may instruct the mobile device 115-*b* to make measurements on a reduced set of cells (e.g., a ranked reduced set) or perhaps only on the predicted next cell. Additionally or alternatively, the network may indicate to the mobile device 115-*b* that one or more of the neighboring cells have been blacklisted. The mobile device 115-*b* may then omit the blacklisted neighboring cells. The network may select at least one the blacklisted cells based on the historical profile information associated with the mobile device 115-*b*. In certain examples, one or more of the cells may be blacklisted when the predictive algorithm determines that the mobile device 115-*b* is on the path 205-*a*, but may not be blacklisted when the mobile device 115-*b* is on other known paths or not traveling on any known path. The mobile device 115-*b* may report the requested measurements to the network, and the process may proceed with a handover to the predicted next cell.

In a different scenario, the mobile device 115-*b* may be attached to serving cell 1, and the predictive algorithm may determine a confidence level of 60% that cell 2 is the next cell, a confidence level of 20% that cell A is the next cell, and a confidence level of 20% that cell B is the next cell, the network may instruct the mobile device 115-*b* to make measurements on those three cells. If cell A or B is the strongest, the network and mobile device 115-*b* may operate in their usual or conventional mode without taking behavioral information into account. If cell 2 is the strongest, predictive behavior may be used when selecting cells along the path 205-*a*.

According to a third approach, the predictive behavior of the mobile device 115-*b* may be stored in a network entity (e.g., measurement server) and may be accessed by both a predictive algorithm application in the mobile device 115-*b* and a predictive algorithm in the network. When both the mobile device 115-*b* and the network determine that there is a high degree of confidence that cell 2 is the next cell after the strength of cell 1 drops, the mobile device 115-*b* and the network may perform a handover to cell 2 without requesting measurements of cell 2 and without reporting measurements of cell 2 (e.g., a blind handover or blindoff).

FIG. 3B shows another example of the path 205-*a* between the home location 305 and the work location 310. In certain examples, because the mobile device 115-*b* may store profile information based on collected historical information associated with mobility patterns of the mobile device 115-*b*, the mobile device 115-*b* may be able to skip certain cells along the path 205-*a* that the mobile device 115-*b* would have otherwise reselected (e.g., based on network defined thresholds) or handed over to (e.g., in response to a handover request message from the network). The mobile device 115-*b* may elect to skip these cells based on a determination that the value of handing over or reselecting to these cells is limited. For example, the mobile device 115-*b* may determine that the time that would be spent on a cell would be limited due to ping-ponging between the cell and a neighboring cell. In particular, the mobile device 115-*b* may perform this skipping during an idle mode, where user plane data is not actively being transmitted or received at the mobile device 115-*b*.

In some cases, a cell that the mobile device 115-*b* elects to skip may have a higher received signal strength indicator (RSSI) value than the current cell to which the mobile device 115-*b* is connected. If the mobile device 115-*b* elects to skip a cell with a higher RSSI value, the mobile device 115-*b* may move to a future cell along the path 205-*a* (which may also have a lower RSSI value than the cell being skipped) or remain connected to the current cell.

In certain examples, the mobile device 115-*b* may adjust one or more mobility parameters associated with cell measurements along the path 205-*a*. The cell measurement adjustments may include increasing the cell measurements of one or more cells (e.g., to increase the likelihood of selection as a handover or reselection target) and/or decreasing the measurement of one or more cells (e.g., to decrease the likelihood of selection as a handover or reselection target). For example, if the mobile device 115-*b* elects to skip a cell along the path 205-*a*, measurements taken by the mobile device 115-*b* of that cell may be modified or biased such that a handover to or reselection of that cell does not occur. In another example, the mobile device 115-*b* may modify the parameters of the cell measurements for the serving cell to delay or refrain from performing a handover or reselection for a period of time, e.g., for enough time to permit the mobile device 115-*b* to enter the coverage area of a preferred target cell.

Additionally or alternatively, the mobile device 115-*b* may adjust one or more handover or reselection criterion parameters to affect under what conditions a handover will occur. For example, the RSSI threshold triggering handover or reselection to one or more cells may be increased (e.g., to decrease the likelihood of selection as a handover or reselection target) or decreased (e.g., to increase the likelihood of selection as a handover or reselection target). This modification of RSSI thresholds or other handover or reselection criterion parameters may result in expanded effective coverage areas 320 (indicated by dashed lines) for selected cells along the path 205-*a* and/or reduced effective coverage areas 320 for other cells along the path 205-*a*.

These modifications to the cell measurement adjustments and/or the handover or reselection criterion parameters may be chosen and enforced by the network, the mobile device 115-*b*, or both.

In the example of FIG. 3B, the mobile device 115-*b* may, based on the historical mobility patterns of the mobile device 115-*b*, determine that cells 1, 3, 7, and 9 may provide complete coverage to the mobile device 115-*b* along the path 205-*a* if the lower RSSI thresholds for handover and reselection are applied to these cells. As shown in FIG. 3B, the expanded effective coverage areas 320 of cells 1, 3, 7, and 9 may cover the entire path 205-*a* between the home location 305 and the work location 310. This reduction in the number of cells that the mobile device 115-*b* connects to along the path 205-*a* may accordingly reduce the number of measurements taken by the mobile device 115-*b* and handovers to new cells, thereby reducing power consumption and increasing the battery life of the mobile device 115-*b* and reducing the networking signaling, especially network signaling associated with handovers.

FIG. 3C shows another example of the path 205-*a* between the home location 305 and the work location 310. In certain examples, distinctive physical features of a given area may shape the coverage area of a cell. For example, a street in a large urban area lined with tall buildings may allow for enhanced propagation of radio frequency signals along the corridor of the street. As shown in FIG. 3C, for example, when taking into consideration a lower RSSI threshold for handover and reselection, the expanded effective coverage area 320 of cell 7 may be long and narrow along a street. If the path 205-*a* runs along that street, the mobile device 115-*b* may take advantage of the expanded effective coverage areas 320 of cells 1, 7, and 9 to travel from the home location 305 to the work location 310 by connecting to only cells 1, 7, and 9. The mobile device 115-*b* may elect to skip other cells traversed by the path 205-*a* based on a determination that the mobile device 115-*b* is traveling along the path 205-*a* and that the value of handing over or reselecting to these cells is limited.

Figure 4:
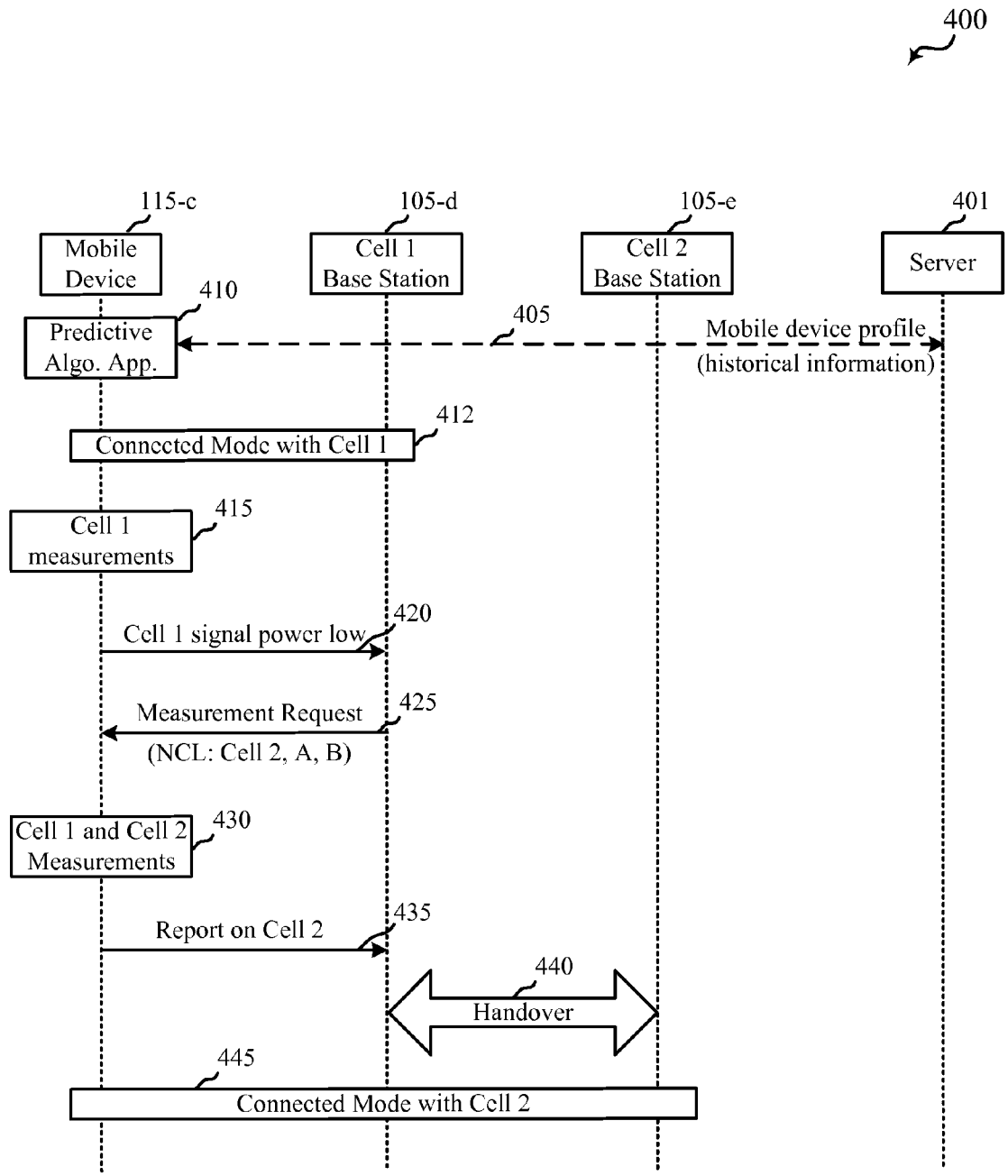
FIG. 4 shows a diagram of an example of communications between devices associated with a handover in a wireless communications system, according to one aspect of the principles described herein.

FIG. 4 shows a diagram of another example of communications between devices associated with a handover in a wireless communications system 400, according to one aspect of the principles described herein. The wireless communications system 400 of the present example includes a mobile device 115-*c*, a base station 105-*e* associated with a first cell ("cell 1"), a base station 105-*f* associated with a second cell ("cell 2"), and an optional measurement server 401 configured to store historical information 405 for the mobile device 115-*c* related to a mobility profile of the mobile device 115-*c*. In certain embodiments, the mobility profile of the mobile device may be stored entirely on the mobile device 115-*c*. The wireless communications system 400 may be an example of one or more of the wireless communications systems 100, 200, 300 described above with respect to the previous Figures.

In the present example, a predictive algorithm application 410 may be executed by the mobile device 115-*c*. The predictive algorithm application 410 of the mobile device 115-*c* may store and/or retrieve historical information associated with mobility patterns of the mobile device 115-*c*. As described above, the historical information may be entirely stored on the mobile device 115-*c*. Alternatively, the predictive algorithm application 410 of the mobile device 115-*c* may retrieve the historical information associated with mobility patterns of the mobile device 115-*c* from the measurement server 401. The mobile device 115-*c* may enter into a connected mode 412 with cell 1.

At block 415, the mobile device 115-*c* may measure the signal strength of cell 1. The mobile device 115-*c* may transmit a report 420 to the base station 105-*e* of cell 1 indicating that the received signal strength indication (RSSI) of cell 1 is low (e.g., below a threshold). Based on the historical information associated with the mobile device 115-*c*, the base station 105-*e* of cell 1 may determine that a handover is imminent and transmit a request 425 to the mobile device 115-*c* to measure the signal strength of a neighboring cell list (NCL) containing neighboring cells 2, A, and B.

Based on the historical information associated with the mobile device 115-*c*, the predictive algorithm application 410 of the mobile device 115-*c* may determine with a confidence level greater than a threshold (e.g., 90%) that the next cell for the mobile device 115-*c* is cell 2. The mobile device 115-*c* may therefore choose to measure the signal strengths of only cell 1 and cell 2 at block 430, transmit a report 435 to the base station 105-*e* of cell 1 of the signal strength of cell 2, and the base station 105-*e* of cell 1 may initiate a handover of the mobile device 115-*c* to cell 2. The base station 105-*e* of cell 1 may then work with the mobile device 115-*c* and the base station 105-*f* of cell 2 to handover 440 the mobile device 115-*c* from cell 1 to cell 2, and the mobile device 115-*c* may enter a connected mode 445 with cell 2.

Figure 5:
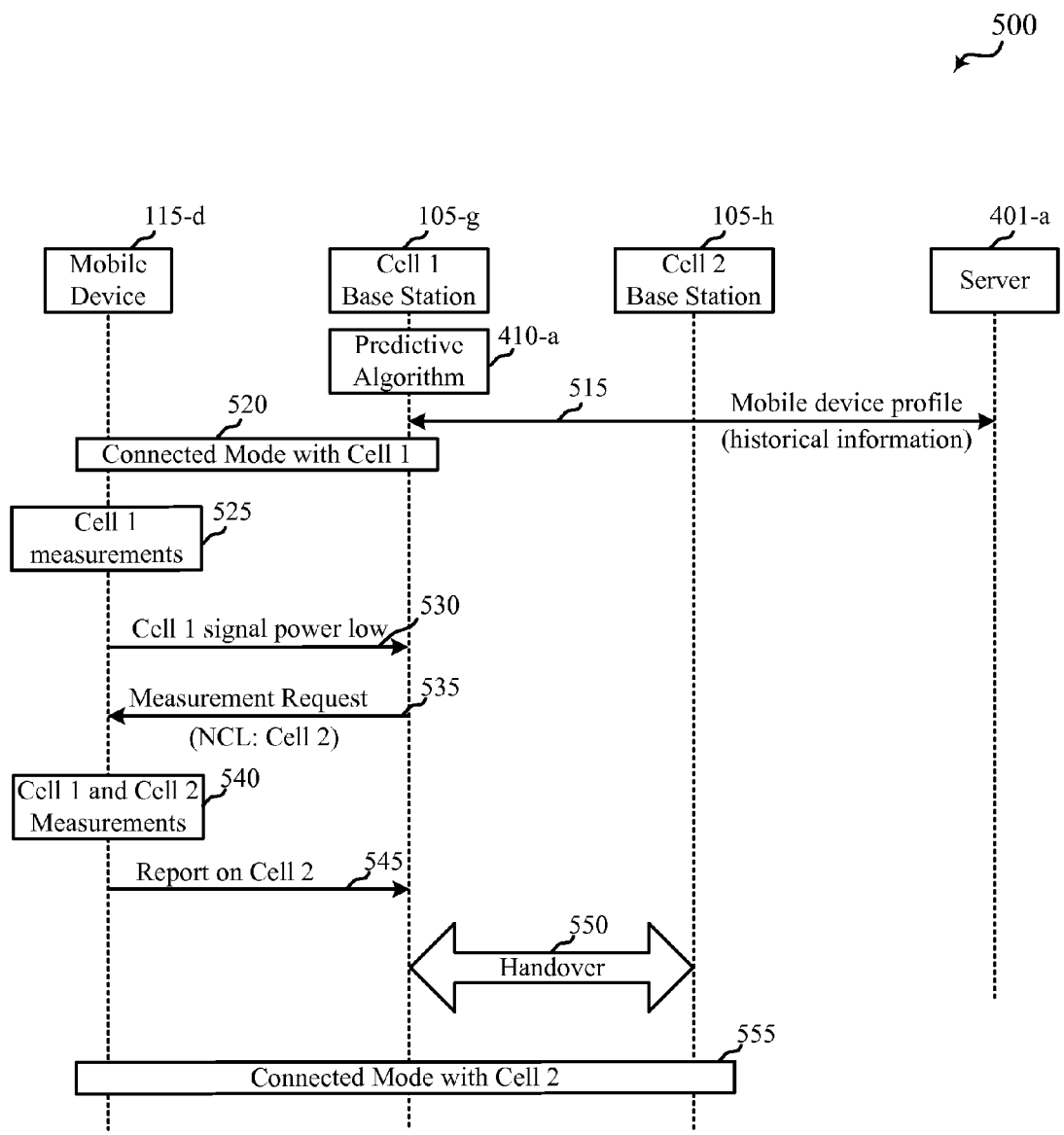
FIG. 5 shows a diagram of an example of communications between devices associated with a handover in a wireless communications system, according to one aspect of the principles described herein.

FIG. 5 shows a diagram of an example of communications between devices associated with a handover in a wireless communications system 500, according to one aspect of the principles described herein. The wireless communications system 500 of the present example includes a mobile device 115-*d*, a base station 105-*g* associated with a first cell ("cell 1"), a base station 105-*h* associated with a second cell ("cell 2"), and a measurement server 401-*a* configured to store historical information for the mobile device 115-*d* related to a mobility profile of the mobile device 115-*d*. The wireless communications system 500 may be an example of one or more of the wireless communications systems 100, 200, 300, 400 described above with respect to the previous Figures.

In the present example, a predictive algorithm application 410-*a* is executed by the base station 105-*g* of cell 1. The base station 105-*g* of cell 1 may communicate with the measurement server 401-*a* to store and/or retrieve historical information 515 associated with mobility patterns of the mobile device 115-*d*. The mobile device 115-*d* may enter into a connected mode 520 with cell 1.

At block 525, the mobile device 115-*d* may measure the signal strength of cell 1, the serving cell. The mobile device 115-*d* may transmit a report 530 to the base station 105-*g* of cell 1 indicating that the received signal strength indication (RSSI) of cell 1 is low (e.g., below a threshold). Based on the historical information associated with the mobile device 115-*d*, the base station 105-*g* of cell 1 may use the predictive algorithm application 410-*a* to determine with a confidence level greater than a threshold (e.g., 90%) that the next cell for the mobile device 115-*d* is cell 2. Accordingly, the base station 105-*g* of cell 1 may transmit a request 535 to the mobile device 115-*d* to measure the signal strength of a neighboring cell list (NCL) containing only cell 2. The base station 105-*g* may exclude all other neighboring cells from the NCL.

The mobile device 115-*d* may measure the signal strengths of cell 1 and cell 2 at block 540, transmit a report 545 to the base station 105-*g* of cell 1 that the signal strength of cell 2 is greater than a threshold level, and the base station 105-*g* of cell 1 may initiate a handover of the mobile device 115-*d* to cell 2. The base station 105-*g* of cell 1 may then work with the mobile device 115-*d* and the base station 105-*h* of cell 2 to handover 550 the mobile device 115-*d* from cell 1 to cell 2, and the mobile device 115-*d* may enter a connected mode 555 with cell 2.

Figure 6:
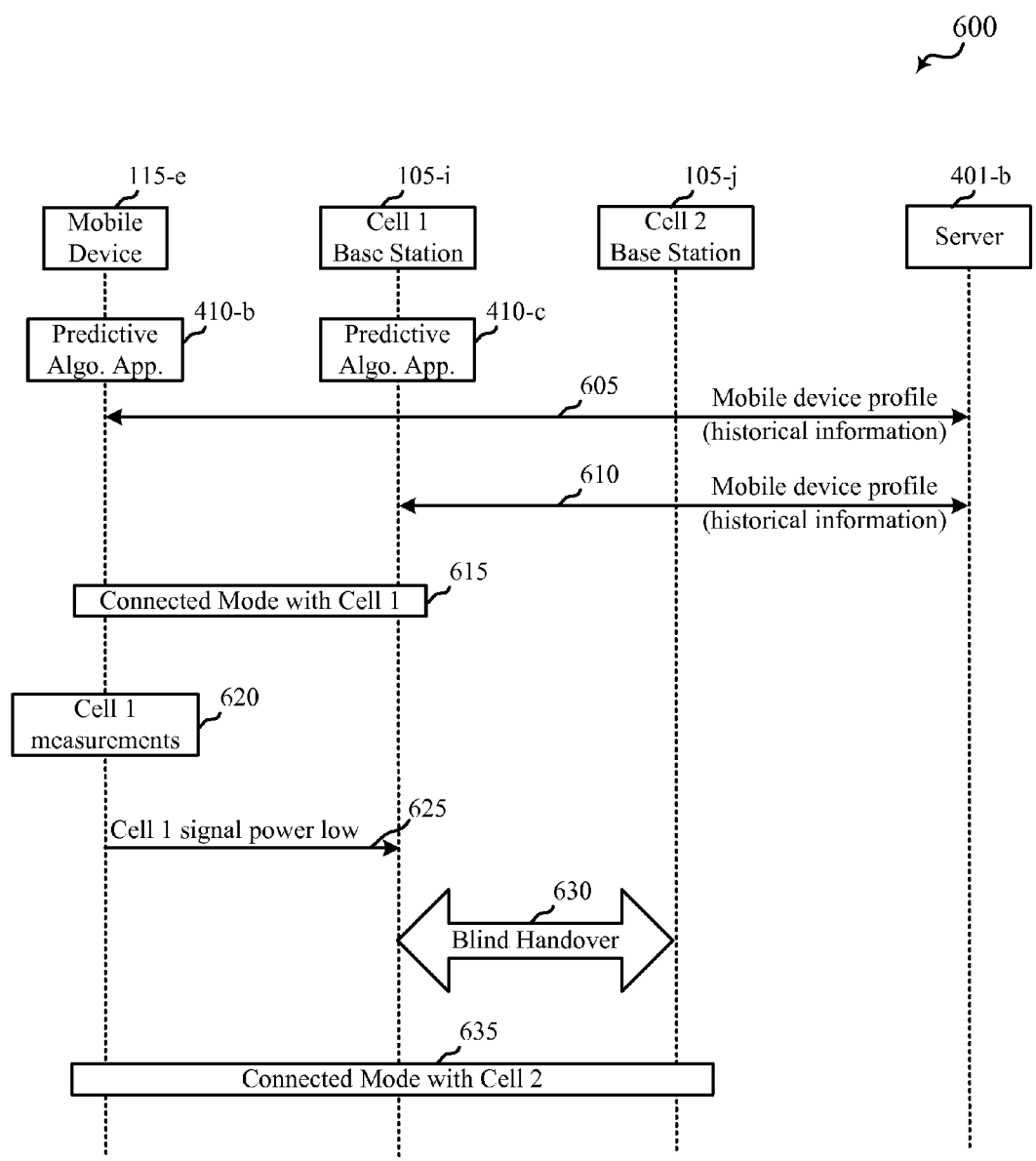
FIG. 6 shows a diagram of an example of communications between devices associated with a handover in a wireless communications system, according to one aspect of the principles described herein.

FIG. 6 shows a diagram of another example of communications between devices associated with a handover in a wireless communications system 600, according to one aspect of the principles described herein. The wireless communications system 600 of the present example includes a mobile device 115-*e*, a base station 105-*i* associated with a first cell ("cell 1"), a base station 105-*j* associated with a second cell ("cell 2"), and a measurement server 401-*b* configured to store historical information for the mobile device 115-*e* related to a mobility profile of the mobile device 115-*e*. The wireless communications system 600 may be an example of one or more of the wireless communications systems 100, 200, 300, 400, 500 described above with respect to the previous Figures.

In the present example, predictive algorithm applications 410 are executed by both the base station 105-*i* of cell 1 and the mobile device 115-*e*. The predictive algorithm applications 410 may communicate with the measurement server 401-*b* to store and/or retrieve historical information 605, 610 associated with mobility patterns of the mobile device 115-*e*. The mobile device 115-*e* may enter into a connected mode 615 with cell 1.

At block 620, the mobile device 115-e may measure the signal strength of cell 1. The mobile device 115-e may transmit a report 625 to the base station 105-i of cell 1 indicating that the received signal strength indication (RSSI) of cell 1 is low (e.g., below a threshold). Based on the historical information associated with the mobile device 115-e, the predictive algorithm applications 410 of the base station 105-i and the mobile device 115-e may determine that a handover is imminent and that, based on a predictive analysis of the historical information related to the mobility profile of the mobile device 115-e, that the cell 2 is the next cell for the mobile device 115-e. Accordingly, the base station 105-i of cell 1 may work with the mobile device 115-e and the base station 105-j of cell 2 to perform a blind handover 630 the mobile device 115-e from cell 1 to cell 2, and the mobile device 115-e may enter a connected mode 635 with cell 2.

Figure 7:
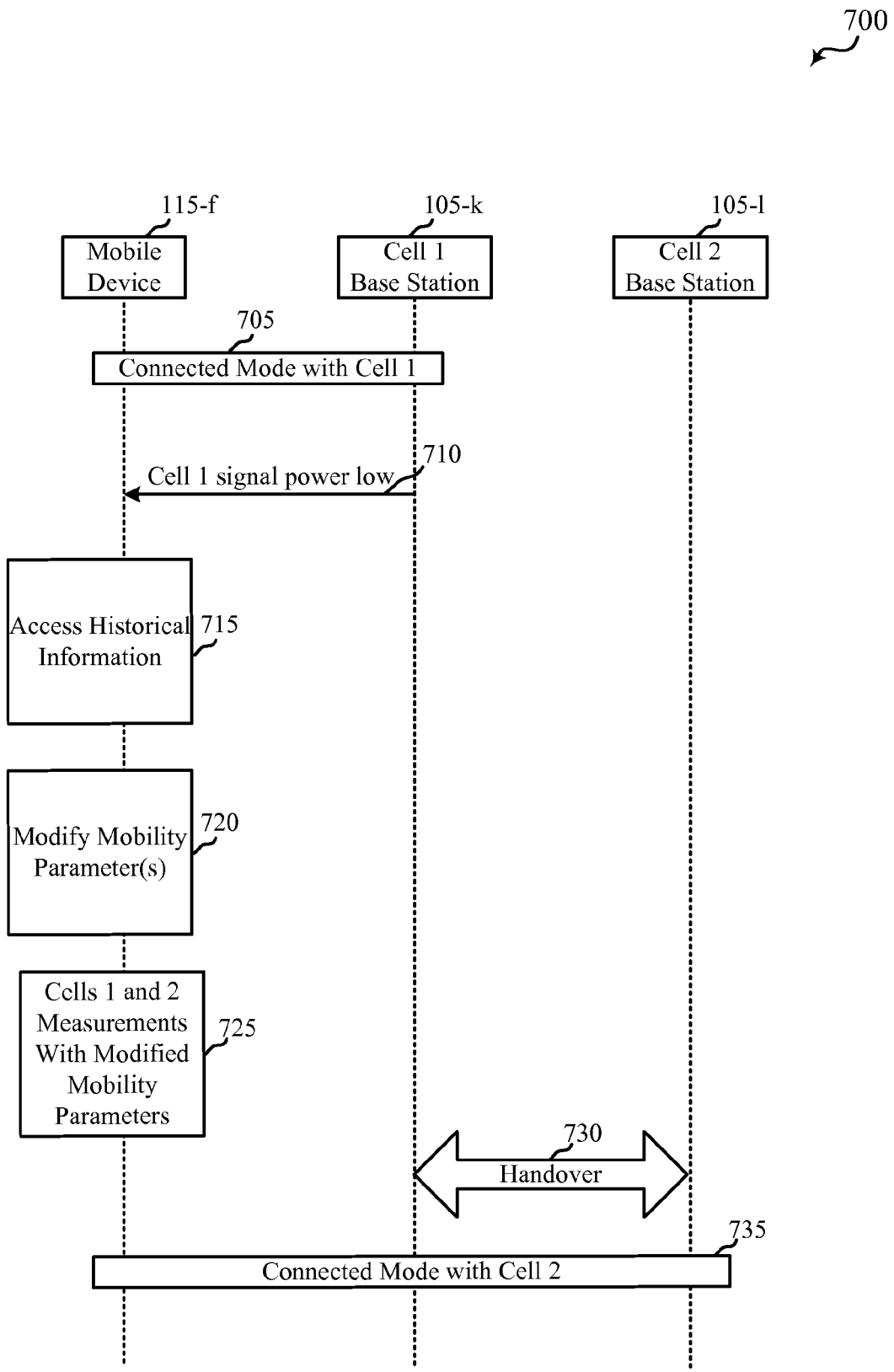
FIG. 7 shows a diagram of an example of communications between devices associated with a handover in a wireless communications system, according to one aspect so the principles described herein.

FIG. 7 shows a diagram of another example of communications between devices associated with a handover in a wireless communications system 700, according to one aspect of the principles described herein. The wireless communications system 700 of the present example includes a mobile device 115-f, a base station 105-k associated with a first cell ("cell 1"), and a base station 105-l associated with a second cell ("cell 2"). In the wireless communications system 700, the mobile device 115-f may be configured to store historical information for the mobile device 115-f related to a mobility profile of the mobile device 115-f. The wireless communications system 700 may be an example of one or more of the wireless communications systems 100, 200, 300, 400, 500, 600 described above with respect to the previous Figures.

The mobile device 115-f may enter into a connected mode 705 with cell 1. At block 710, the mobile device 115-f may measure the signal strength of cell 1 and determine that a handoff or cell reselection may be called for, e.g., that the received signal strength indication (RSSI) of cell 1 is low or below a threshold. The mobile device 115-f may access historical information at block 715 associated with mobility patterns of the mobile device 115-f and modify one or more mobility parameters at block 720. The modified mobility parameters may be associated with measurements for handover or cell reselection of the mobile device 115-f. In some examples, the mobile device 115-f may modify mobility parameters associated with a signal strength measurement, a handover or cell reselection threshold, a search window size, a timing associated with the serving cell and/or at least one neighboring cell, and the like.

Additionally or alternatively, the mobile device 115-f may modify a mobility parameter associated with a tracking area parameter. For instance, the location of the mobile device 115-f may be tracked within the geographic coverage areas of multiple cells. Cells within a particular geographic area may share a common tracking area parameter. In some examples, the mobile device 115-f may modify a tracking area parameter such that the mobile device 115-f may restrict the measurements associated with handover or cell reselection to neighboring cells having the same tracking area. As such, measurements for cells associated with a different tracking area can be eliminated or reduced.

Additionally or alternatively, the mobile device 115-f may modify a mobility parameter based on a mobility parameter history for the neighboring cells. For instance, the mobile device 115-f may analyze the historical information to determine whether a given set of mobility parameters resulted in the successful and sustained connection to one or more of the neighboring cells. The mobility parameter history may be based on network predefined mobility parameters and/or on previously modified mobility parameters. Accordingly, the mobile device 115-f may determine to a predefined confidence level (e.g., >90%) whether previously modified mobility parameters were helpful and consider the past success (or failure) in determining whether, and to what extent, the mobility parameters may be modified in the present circumstances.

At block 725, the mobile device 115-f may perform measurements of the base station 105-k of cell 1 and base station 105-l of cell 2 using the modified mobility parameters. Based on the measurements, the mobile device 115-f may determine that a handover is imminent and that, based on the modified mobility parameters, cell 2 is the next cell for the mobile device 115-f. Accordingly, the base station 105-k of cell 1 may work with the mobile device 115-f and the base station 105-l of cell 2 to perform a handover at block 730 of the mobile device 115-f from cell 1 to cell 2, and the mobile device 115-f may enter a connected mode 735 with cell 2.

Figure 8:
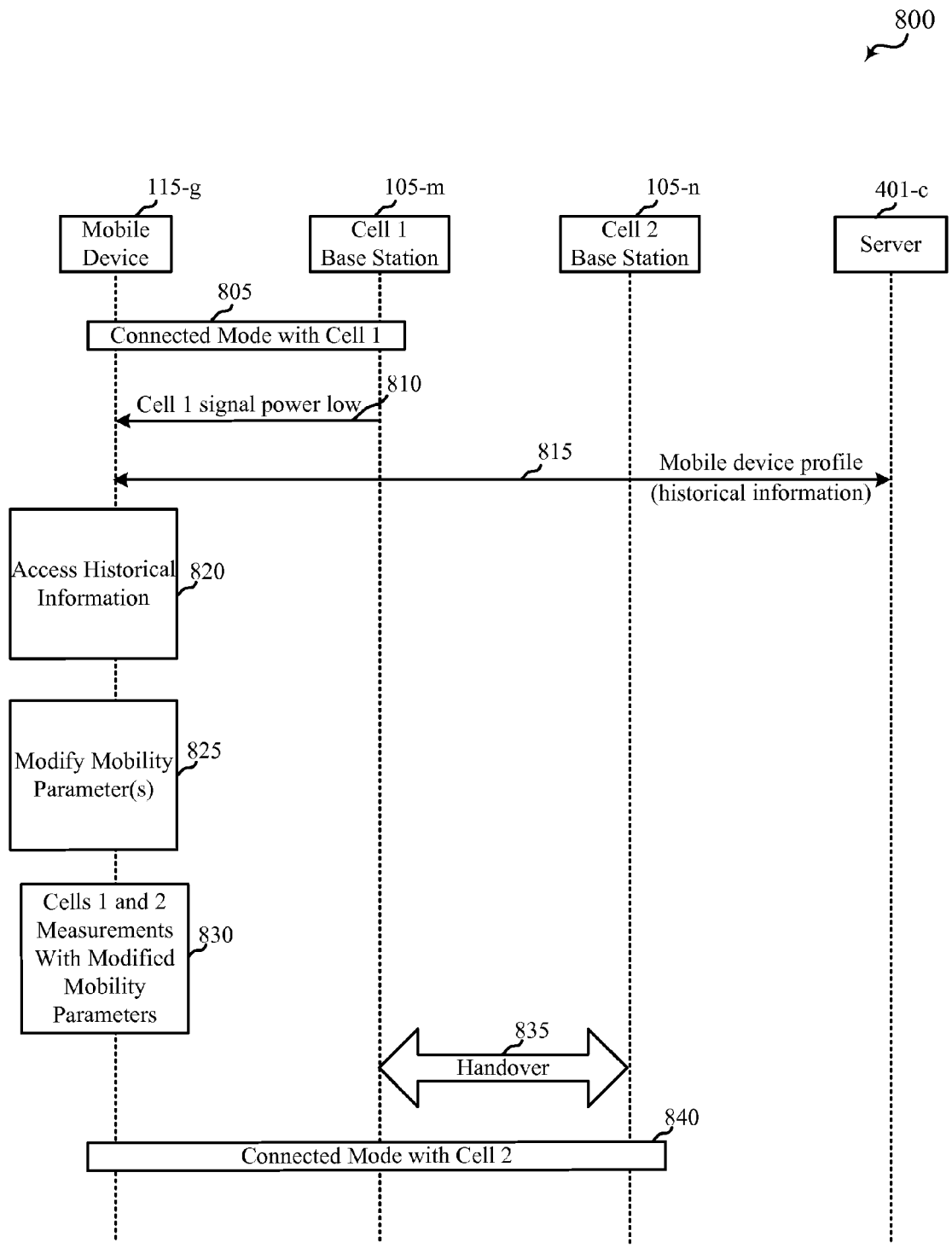
FIG. 8 shows a diagram of an example of communications between devices associated with a handover in a wireless communications system, according to one aspect so the principles described herein.

FIG. 8 shows a diagram of another example of communications between devices associated with a handover in a wireless communications system 800, according to one aspect of the principles described herein. The wireless communications system 800 of the present example includes a mobile device 115-g, a base station 105-m associated with a first cell ("cell 1"), a base station 105-n associated with a second cell ("cell 2"), and a measurement server 401-c configured to store historical information for the mobile device 115-g related to a mobility profile of the mobile device 115-g. The mobile device 115-g may be configured to store historical information for the mobile device 115-g related to a mobility profile of the mobile device 115-g. The wireless communications system 800 may be an example of one or more of the wireless communications systems 100, 200, 300, 400, 500, 600, 700 described above with respect to the previous Figures.

The mobile device 115-g may enter into a connected mode with cell 1 at block 805. At block 810, the mobile device 115-g may measure the signal strength of cell 1 and determine that a handoff or cell reselection may be imminent. The mobile device 115-g may receive all or a portion of the historical information from the measurement server 401-c at block 815. The mobile device 115-g may access the historical information at associated with mobility patterns of the mobile device 115-g at block 820 and modify one or more mobility parameters at block 825. The modified mobility parameters may be associated with measurements for handover or cell reselection of the mobile device 115-g. In some examples, the mobile device 115-g may modify mobility parameters associated with a signal strength measurement, a handover or cell reselection threshold, a search window size, a timing associated with the serving cell and/or at least one neighboring cell, and the like. The mobility parameters may, additionally or alternatively, be associated with a tracking area parameter and/or, in some aspects, historical mobility parameters.

At block 830, the mobile device 115-g may perform measurements of the base station 105-m of cell 1 and base station 105-n of cell 2 using the modified mobility parameters. Based on the measurements, the mobile device 115-g may determine that a handover is imminent and that, based on the modified mobility parameters, that the cell 2 is the next cell for the mobile device 115-g. Accordingly, the base station 105-m of cell 1 may work with the mobile device 115-g and the base station 105-n of cell 2 to perform a handover of the mobile device 115-g from cell 1 to cell 2 at block 835, and the mobile device 115-g may enter a connected mode with cell 2 at block 840.

Figure 9:
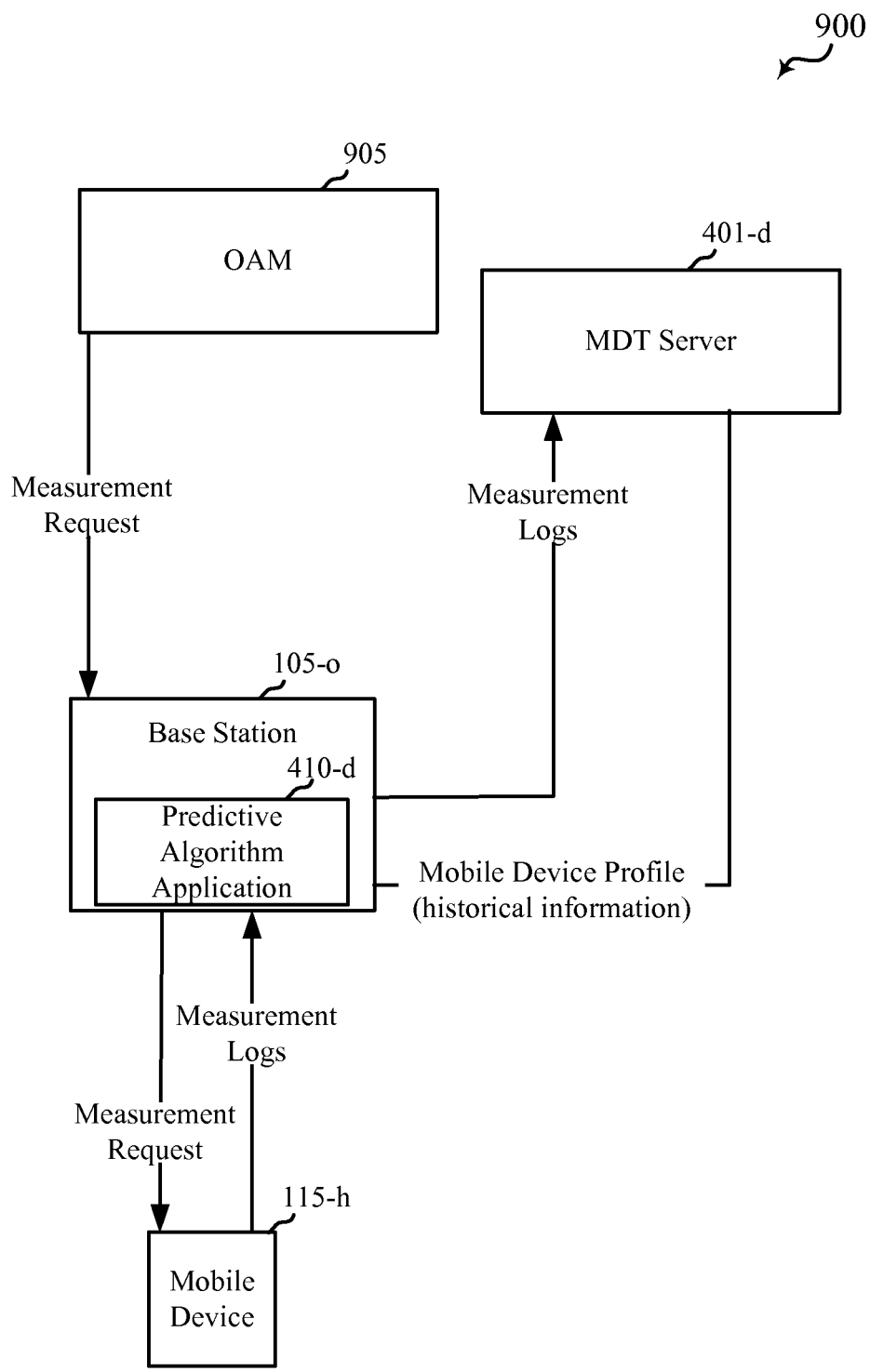
FIG. 9 shows a block diagram of a wireless communications system, according to one aspect of the principles described herein.

FIG. 9 shows a block diagram of a wireless communications system 900, according to one aspect of the principles described herein. The wireless communications system 900 may include an operations, administration and management (OAM) system 905, a minimize drive test (MDT) server 401-d, a base station 105-o, and a mobile device 115-h. Each of these components may be in communication, directly or indirectly. The wireless communications system 900 may include aspects of one or more of the wireless communications systems 100, 200, 300, 400, 500, 600, 700, 800 described above with reference to the previous Figures.

The MDT server 401-d may be a server used by the network to gather information used by network operators in evaluating network performance. The MDT server 401-d may be an example of one or more of the measurement servers 401 described above with reference to FIGS. 4-8. Using the MDT server 401-d, measurements taken at a mobile device 115-h in connected mode (immediate MDT) or idle mode (logged MDT) may be requested from the mobile device 115-h. The types of measurements taken by the mobile device 115-h and requested by the MDT server 401-d may include serving and neighboring cell radio frequency (RF) measurements, including carrier frequencies, physical cell IDs, location, signal strength measurements (e.g., RSCP, RSRQ, RSRP), time measurements, and the like.

The controller for the MDT functionality may reside in the OAM system 905 of the network. The OAM system 905 may initiate and control the MDT data collection processes by sending a message activating the measurements and also including parameters for the data collection to the base station 105-o. The base station 105-o may then pass on the message to the mobile device 115-h. After the measurements are completed by the mobile device 115-h, the mobile device 115-h may transmit the collected measurements to the base station 105-o, and these measurements may then be forwarded to the MDT server 401-d for storage and processing.

One or more MDT servers 401-d deployed in a network may be used to store historical information for the mobile device 115-h associated with mobility patterns of the mobile device 115-h. The historical information for the mobile device 115-h may be gathered and transmitted to the MDT server 401-d for storage. The historical information may then be used by a predictive algorithm application 410-d running on the base station 105-o (as shown in FIG. 9) and/or the mobile device 115-h (not shown) to identify a subset of a set of neighboring cells for measurement by the mobile device 115-h and/or to modify mobility parameters for measuring the neighboring cells consistent with the foregoing principles. While the base station 105-o of FIG. 9 is shown running a predictive algorithm application 410-d, it will be understood that one or more of the base stations 105 gathering the historical information for the mobile device 115-h may not be running the predictive algorithm application 410-d.

Figure 10:
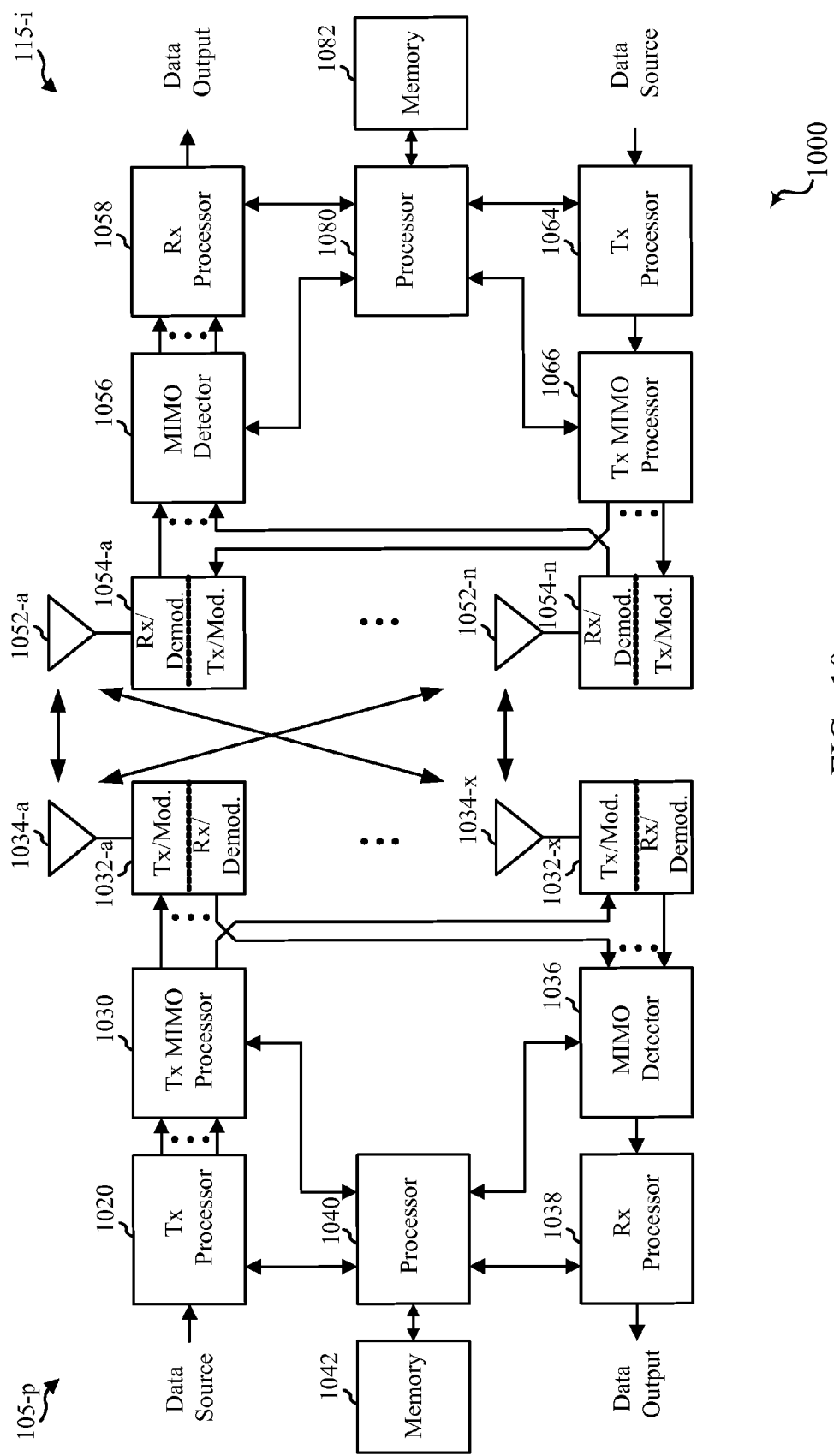
FIG. 10 shows a block diagram of a wireless communications system, according to one aspect of the principles described herein.

FIG. 10 shows a block diagram of a wireless communications system 1000, according to one aspect of the principles described herein. Specifically, FIG. 10 illustrates a design of a base station 105-p and a mobile device 115-i, in accordance with an aspect of the present disclosure. The wireless communications system 1000 may illustrate aspects of one or more of the wireless communications systems 100, 200, 300, 400, 500, 600, 700, 800, 900 described above with reference to previous Figures. For example, the base station 105-p may be an example of one or more of the base stations 105 described above with respect to FIGS. 1-9, and the mobile device 115-i may be an example of one or more of the mobile devices 115 described above with respect to FIGS. 1-9.

The base station 105-p may be equipped with base station antennas 1034-a through 1034-x, where x is a positive integer, and the mobile device 115-i may be equipped with mobile device antennas 1052-a through 1052-n, where n is a positive integer. In the wireless communications system 1000, the base station 105-p may be able to send data over multiple communication links at the same time. Each communication link may be called a "layer" and the "rank" of the communication link may indicate the number of layers used for communication. For example, in a 2×2 MIMO system where base station 105-p transmits two "layers," the rank of the communication link between the base station 105-p and the mobile device 115-i is two.

At the base station 105-p, a base station transmit processor 1020 may receive data from a base station data source and control information from a base station processor 1040 or other controller. The control information may be for the PBCH, PCFICH, PHICH, PDCCH, etc. The data may be for the PDSCH, etc. The base station transmit processor 1020 may process (e.g., encode and symbol map) the data and control information to obtain data symbols and control symbols, respectively. The base station transmit processor 1020 may also generate reference symbols, e.g., for the PSS, SSS, and cell-specific reference signal. An base station transmit (TX) MIMO processor 1030 may perform spatial processing (e.g., precoding) on data symbols, control symbols, and/or reference symbols, if applicable, and may provide output symbol streams to the base station modulator/demodulators 1032-a through 1032-x. Each base station modulator/demodulator 1032 may process a respective output symbol stream (e.g., for OFDM, etc.) to obtain an output sample stream. Each base station modulator/demodulator 1032 may further process (e.g., convert to analog, amplify, filter, and upconvert) the output sample stream to obtain a downlink (DL) signal. In one example, DL signals from base station modulator/demodulators 1032-a through 1032-x may be transmitted via the base station antennas 1034-a through 1034-x, respectively.

At the mobile device 115-i, the mobile device antennas 1052-a through 1052-n may receive the DL signals from the base station 105-p and may provide the received signals to the mobile device modulator/demodulators 1054-a through 1054-n, respectively. Each mobile device modulator/demodulator 1054 may condition (e.g., filter, amplify, downconvert, and digitize) a respective received signal to obtain input samples. Each mobile device modulator/demodulator 1054 may further process the input samples (e.g., for OFDM, etc.) to obtain received symbols. A mobile device MIMO detector 1056 may obtain received symbols from all the mobile device modulator/demodulators 1054-a through 1054-n, perform MIMO detection on the received symbols if applicable, and provide detected symbols. A mobile device receiver processor 1058 may process (e.g., demodulate, deinterleave, and decode) the detected symbols, providing decoded data for the mobile device 115-i to a data output, and provide decoded control information to a mobile device processor 1080 or controller, or mobile device memory 1082.

On the uplink (UL), at the mobile device 115-i, a mobile device transmit processor 1064 may receive and process data from a mobile device data source. The mobile device transmit processor 1064 may also generate reference symbols for a reference signal. The symbols from the mobile device transmit processor 1064 may be precoded by a mobile device transmit MIMO processor 1066 if applicable, further processed by the mobile device modulator/demodulators 1054-*a* through 1054-*n* (e.g., for SC-FDMA, etc.), and be transmitted to the base station 105-*p* in accordance with the transmission parameters received from the base station 105-*p*. At the base station 105-*p*, the UL signals from the mobile device 115-*i* may be received by the base station antennas 1034, processed by the base station modulator/demodulators 1032, detected by a base station MIMO detector 1036 if applicable, and further processed by a base station receiver processor 1038. The base station receiver processor 1038 may provide decoded data to a base station data output and to the base station processor 1040.

The components of the mobile device 115-*i* may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 1000. Similarly, the components of the base station 105-*p* may, individually or collectively, be implemented with one or more Application Specific Integrated Circuits (ASICs) adapted to perform some or all of the applicable functions in hardware. Each of the noted components may be a means for performing one or more functions related to operation of the wireless communications system 1000.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

In one configuration, the base station 105-*p* may operate as a serving base station 105-*p* for the mobile device 115-*i*, and may include means for identifying a set of neighboring cells for measurement by the mobile device 115-*i* and/or modifying one or more mobility parameters for measurements associated with handover or cell reselection, where the identification and/or modification is based on historical information associated with mobility patterns of the mobile device 115-*i*. In one aspect, the aforementioned means may be the base station processor 1040, the base station memory 1042, the base station transmit processor 1020, base station receiver processor 1038, the base station modulator/demodulators 1032, and the base station antennas 1034 of the base station 105-*p* configured to perform the functions recited by the aforementioned means.

In an additional or alternative configuration, the mobile device 115-*i* may include means for identifying a set of neighboring cells for measurement by the mobile device 115-*i* and/or modifying one or more mobility parameters for measurements associated with handover or cell reselection, where the identification and/or modification is based on historical information associated with mobility patterns of the mobile device 115-*i*. In one aspect, the aforementioned means may be the mobile device processor 1080, the mobile device memory 1082, the mobile device transmit processor 1064, mobile device receiver processor 1058, the mobile device modulator/demodulators 1054, and the mobile device antennas 1052 configured to perform the functions recited by the aforementioned means.

Figure 11:
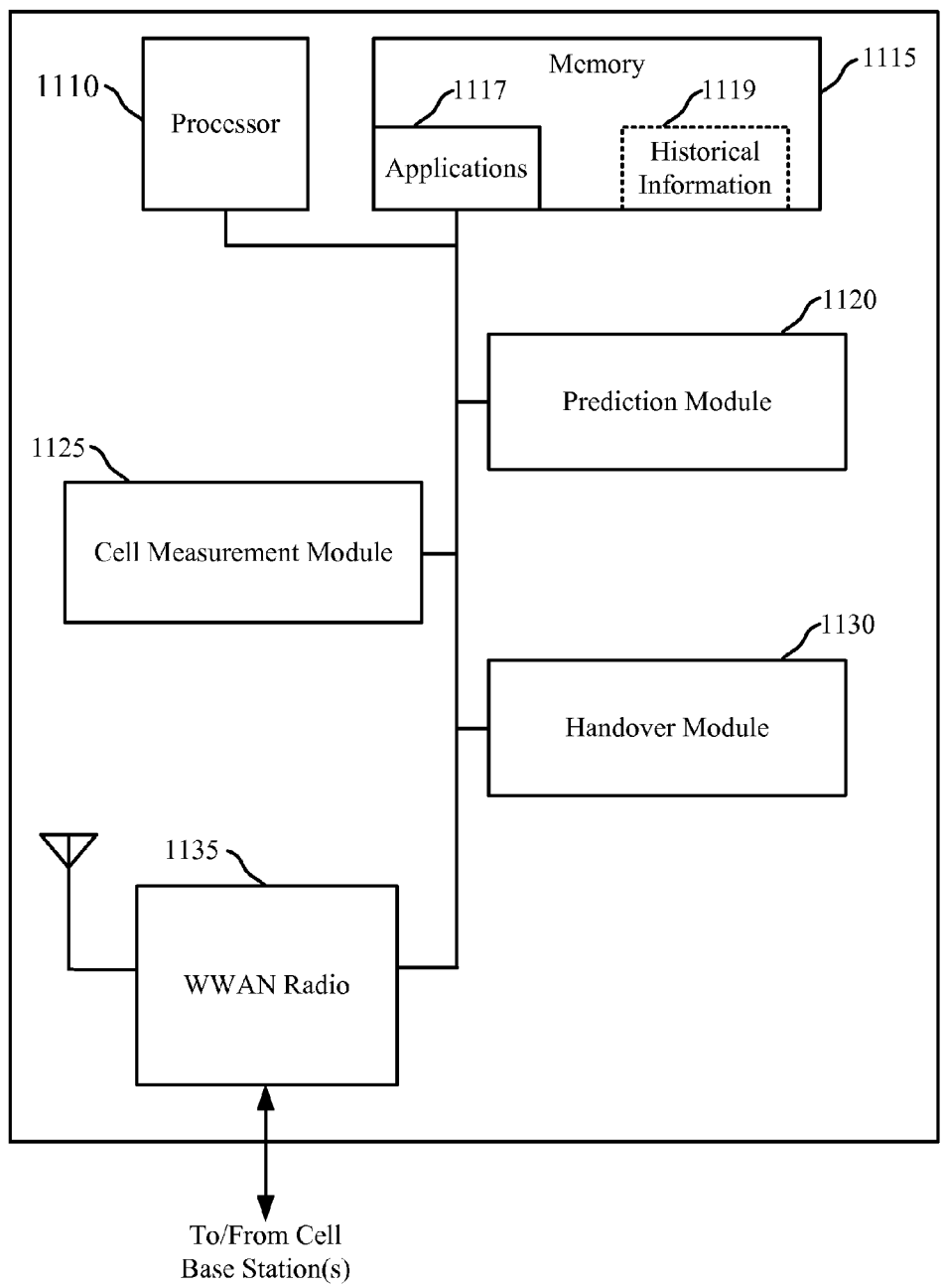
FIG. 11 shows a block diagram of one example of a mobile device, according to one aspect of the principles described herein.

FIG. 11 shows a block diagram of one example of a mobile device 115-*j*, according to one aspect of the principles described herein. The mobile device 115-*j* may be an example of one or more of the mobile devices 115 described above with reference to the previous Figures.

The mobile device 115-*j* of FIG. 11 may include a processor 1110, a memory 1115, a prediction module 1120, a cell measurement module 1125, a handover module 1130, and a wireless wide area network (WWAN) radio 1135. Each of these components may be in communication, directly or indirectly.

The processor 1110 may be configured to execute computer-readable program code stored by the memory 1115 to implement one or more aspects of the prediction module 1120, the cell measurement module 1125, the handover module 1130, and/or the wireless wide area network (WWAN) radio 1135. The processor 1110 may also execute computer-readable program code stored by the memory 1115 to implement other applications 1117.

The prediction module 1120 may be configured to implement the functionality of one or more of the predictive algorithm applications 410 described above with respect to the previous Figures. In certain examples, the prediction module 1120 may identify a subset of a set of neighboring cells for measurement by the mobile device 115-*j* based on historical information 1119 associated with mobility patterns of the mobile device 115-*j*. The subset may further be identified based on a current location or state of the mobile device 115-*j* in relation to the historical information 1119. Additionally or alternatively, the prediction module 1120 may identify, based on the historical information 1119, an order in which measurements of neighboring cells are to be performed (e.g., according to the likelihood of being the next cell). In additional or alternative examples, the prediction module 1120 may identify how frequently measurements of neighboring cells are performed and/or the type of measurements to take.

In certain examples, a serving cell of the mobile device 115-*j* (e.g., a cell associated with one or more of the base stations 105 described in other Figures of the present disclosure) may identify the subset of the neighboring cells based on the historical information 1119, the order of measurements, the frequency of measurements, and/or the type of measurements as described above. In this case, the prediction module 1120 may determine this information based on signaling from the serving cell. The mobile device 115-*j* may communicate with the serving cell using the WWAN radio 1135. In certain examples, the prediction module 1120 may communicate with a server (e.g., over WWAN radio 1135) to receive the historical information 1119. Additionally or alternatively, the mobile device 115-*j* may collect and store the historical information 1119 locally in the memory 1115 of the mobile device 115-*j*, as shown in FIG. 11.

The historical information may include information about the mobility patterns of the mobile device 115-*j*. The mobility patterns may include, for example, a route and a schedule of the mobile device 115-*j* between a first location and a second location. Additionally or alternatively, the mobility patterns may include a location and a period of time during which the mobile device 115-*j* remains at the location. Thus, in certain examples, the historical information may include a serving cell history of the mobile device 115-*j* over a predetermined period of time, as observed and stored by the server, the serving cell, and/or the mobile device 115-*j*.

The cell measurement module 1125 may be configured to perform signal strength measurements on the one or more neighboring cells according to the determinations made by the prediction module 1120. For example, the cell measurement module may make measurements of an identified subset of the neighboring cells and report the signal strength measurements to the serving cell. The handover module 1130 may be configured to perform a handover or reselection of the mobile device 115-*j* to a target cell in the identified subset. In certain examples, the serving cell may select the target cell from the identified subset based on the signal strength measurements provided by the cell measurement module 1125. The serving cell may then indicate the selected target cell to the mobile device 115-*j* through WWAN signaling. Additionally or alternatively, the mobile device 115-*j* may perform or aid in the selection of the target cell based on the signal strength measurements for the identified subset.

In certain examples, the identified subset may include a single neighboring cell. In such cases, the cell measurement module 1125 may measure a signal strength associated with the single neighboring cell, and the handover module 1130 may perform a handover (initiated by the mobile device 115-*j* or the serving cell) of the mobile device 115-*j* to the single neighboring cell if the signal strength of the single neighboring cell is greater than a threshold level. Accordingly, the prediction module 1120 and cell measurement module 1125 may determine not to perform signal strength measurements of neighboring cells other than the single neighboring cell when the signal strength of the single neighboring cell is greater than a threshold level.

In certain examples, the prediction module 1120 may determine a quality metric for each of the neighboring cells in the set, and the subset may be selected to include each neighboring cell that has a quality metric greater than a threshold level. The quality metric may be based on, for example, the signal strength of each neighboring cell, a data rate associated with the neighboring cell, an ability of the neighboring cell to perform offloading to an alternate radio access technology, a projected amount of time for which the mobile device 115-*j* will remain connected to the neighboring cell, and/or other relevant factors. In certain examples, known mean and standard deviation values of the signal strength for the cell may influence the effect of the signal strength on the quality metric for that cell. In certain examples, the prediction module 1120 or the serving cell may rank the neighboring cells in the subset according to their respective quality metrics.

In certain examples, the prediction module 1120 may base the quality metric of each neighboring cell on a confidence level. The confidence level for each neighboring cell may indicate a level of confidence, based on the historical information 1119 for the mobile device 115-*j*, that the neighboring cell will be the next cell in a mobility path of the mobile device 115-*j*. In such examples, the identified subset of the neighboring cells may include the neighboring cells having a confidence level greater than a threshold level.

In certain examples, the subset of the neighboring cells identified for measurement may include neighboring cells with a confidence level greater than a first threshold (35%). Out of the identified subset, the prediction module 1120 and/or serving cell may determine that one of the neighboring cells in the subset has a confidence level greater than a second, higher threshold (e.g., 90%). In that case, the mobile device 115-*j* may communicate with the serving cell to perform a blind handover (e.g., a handover without measurements) to the neighboring cell having the confidence level higher than the second threshold.

In certain examples, the prediction module 1120 and/or the serving cell for the mobile device 115-*j* may exclude one or more of the neighboring cells from the subset selected for measurements based at least on a current speed of the mobile device 115-*j* and a signal strength of the one or more neighboring cells. For example, if the mobile device 115-*j* is traveling along a known path and momentarily passes through the coverage area of a femtocell while the subset of the neighboring cells selected for measurement is identified, the femtocell may be excluded from the subset of neighboring cells selected for measurement due to the likelihood that the mobile device 115-*j* will soon be outside the coverage area of the femtocell.

Figure 12:
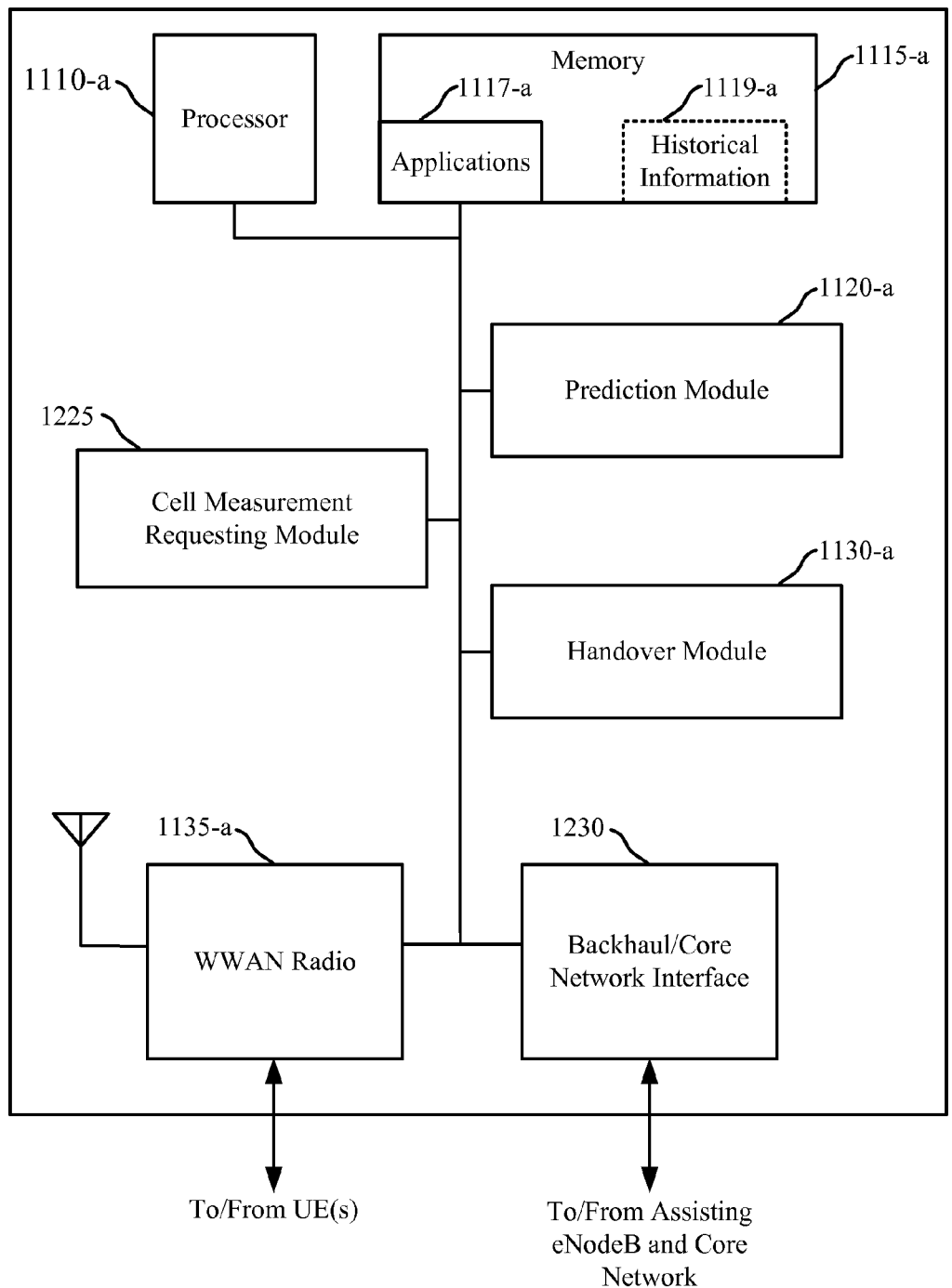
FIG. 12 shows a block diagram of one example of a base station, according to one aspect of the principles described herein.

FIG. 12 shows a block diagram of one example of a base station 105-*q*, according to one aspect of the principles described herein. The base station 105-*q* may be an example of one or more of the base stations 105 described above with reference to the previous Figures. The base station 105-*q* may be associated with a serving cell of one or more of the mobile devices 115 described above with reference to the previous Figures.

The base station 105-*q* of FIG. 12 may include a processor 1110-*a*, a memory 1115-*a*, a prediction module 1120-*a*, a cell measurement requesting module 1225, a handover module 1130-*a*, a wireless wide area network (WWAN) radio 1135-*a*, and a backhaul/core network interface 1230. Each of these components may be in communication, directly or indirectly.

The processor 1110-*a* may be configured to execute computer-readable program code stored by the memory 1115-*a* to implement one or more aspects of the prediction module 1120-*a*, the cell measurement requesting module 1225, the handover module 1130-*a*, the WWAN radio 1135-*a*, and/or the backhaul/core network interface 1230. The processor 1110-*a* may also execute computer-readable program code stored by the memory 1115-*a* to implement other applications 1117-*a*.

The prediction module 1120-*a* may be configured to identify a subset of a set of neighboring cells for measurement by a mobile device (e.g., one or more of the mobile devices 115 described in the present disclosure) based on historical information 1119-*a* associated with mobility patterns of the mobile device. The subset may further be identified based on a current location or state of the mobile device in relation to the historical information 1119-*a*. In certain examples, the base station 105-*q* may select the subset of the neighboring cells based on the historical information 1119-*a* and location or state of the mobile device. The base station 105-*q* may then signal (e.g., using the WWAN radio 1135-*a*) the identified subset of the neighboring cells to the mobile device. Additionally or alternatively, a separate network entity (e.g., a server or mobility management entity (MME)) may select the subset of the neighboring cells based on the historical information 1119-*a* and location or state of the mobile device and signal (e.g., over the backhaul/core network interface 1230) the selected subset of the neighboring cells to the base station 105-*q* for forwarding to the mobile device. In still other examples, the mobile device may itself select the subset of the neighboring cells based on the historical information 1119-*a*.

Additionally or alternatively, the prediction module 1120-*a* may identify, based on the historical information 1119-*a*, an order in which measurements of neighboring cells are to be performed (e.g., according to likelihood of being the next cell) by the mobile device. In additional or alternative examples, the prediction module 1120-a may identify a frequency with which measurements of neighboring cells are performed and/or the type of measurements to take.

In examples where the base station 105-q determines the subset of the neighboring cells to the mobile device for measurement by the mobile device, the base station 105-q may collect and store the historical information 1119-a locally in the memory 1115-a of the base station 105-q, as shown in FIG. 12.

The historical information may include information about the mobility patterns of the mobile device. The mobility patterns may include, for example, a route and a schedule of the mobile device between a first location and a second location. Additionally or alternatively, the mobility patterns may include a location and a period of time during which the mobile device remains at the location. Thus, in certain examples, the historical information may include a serving cell history of the mobile device over a predetermined period of time, as collected by a network server, the base station 105-q, and/or the mobile device.

The cell measurement requesting module 1225 may be configured to instruct the mobile device to perform signal strength measurements on the one or more neighboring cells in the identified subset and report the signal strength measurements to the base station 105-q. The handover module 1130-a may be configured to perform a handover or reselection of the mobile device to a target cell in the identified subset. In certain examples, the handover module 1130-a of the base station 105-q may select the target cell from the identified subset based on the signal strength measurements at the mobile device provided in response to the request made by the cell measurement requesting module 1225. The handover module 1130-a of the base station 105-q may indicate the selected target cell to the mobile device through WWAN signaling. Additionally or alternatively, the mobile device may perform or aid in the selection of the target cell based on the signal strength measurements for the identified subset.

In certain examples, the identified subset may include a single neighboring cell. In such cases, the cell measurement requesting module 1225 may request signal strength measurements for the single neighboring cell, and the handover module 1130-a may perform a handover (initiated by the mobile device or the base station) of the mobile device to the single neighboring cell if the signal strength of the single neighboring cell is greater than a threshold level. Accordingly, the prediction module 1120-a and cell measurement requesting module 1225 may determine not to request signal strength measurements of neighboring cells other than the single neighboring cell when the signal strength of the single neighboring cell is greater than a threshold level.

In certain examples, the prediction module 1120-a may determine a quality metric for each of the neighboring cells in the set, and the subset may be selected to include each neighboring cell that has a quality metric greater than a threshold level. The quality metric may be based on, for example, the signal strength of each neighboring cell, a data rate associated with the neighboring cell, an ability of the neighboring cell to perform offloading to an alternate radio access technology, a projected amount of time for which the mobile device will remain connected to the neighboring cell, and/or other relevant factors. In certain examples, the prediction module 1120-a or the serving cell may rank the neighboring cells in the subset according to their respective quality metrics.

In certain examples, the prediction module 1120-a may base the quality metric of each neighboring cell on a confidence level. The confidence level for each neighboring cell may indicate a level of confidence, based on the historical information 1119-a for the mobile device, that the neighboring cell will be the next cell in a mobility path of the mobile device. In such examples, the identified subset of the neighboring cells may include the neighboring cells having a confidence level greater than a threshold level.

In certain examples, the subset of the neighboring cells identified for measurement may include neighboring cells with a confidence level greater than a first threshold (35%). Out of the identified subset, the prediction module 1120-a and/or mobile device may determine that one of the neighboring cells in the subset has a confidence level greater than a second, higher threshold (e.g., 100%). In that case, the base station 105-q may communicate with the mobile device to perform a blind handover (e.g., a handover without measurements) to the neighboring cell having the confidence level higher than the second threshold.

In certain examples, the prediction module 1120-a and/or the mobile device may exclude one or more of the neighboring cells from the subset selected for measurements based at least on a current speed of the mobile device and a signal strength of the one or more neighboring cells. For example, if the mobile device is traveling along a path and momentarily passes through the coverage area of a femtocell while the subset of the neighboring cells selected for measurement is identified, the femtocell may be excluded from the subset of neighboring cells selected for measurement due to the likelihood that the mobile device will soon be outside the coverage area of the femtocell.

Figure 13:
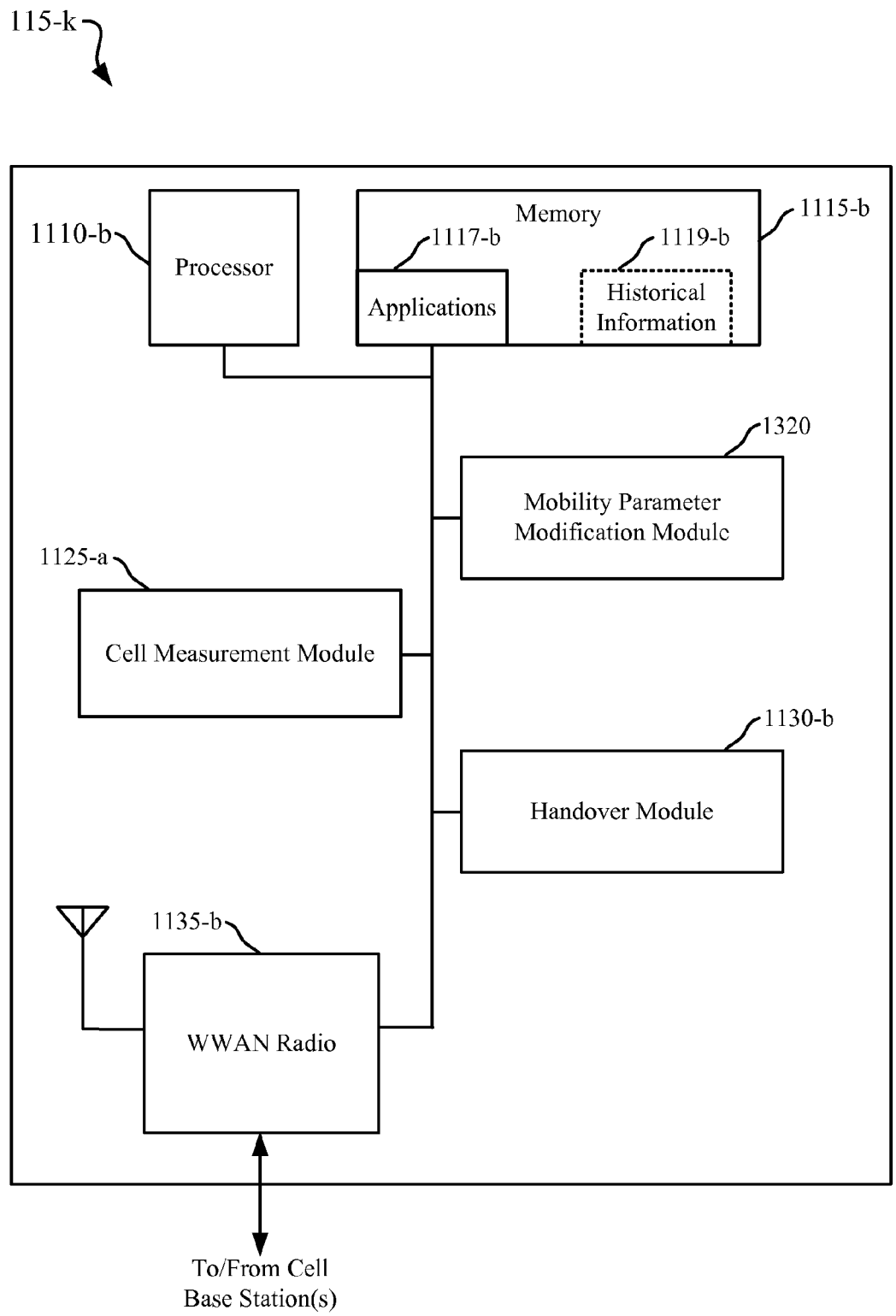
FIG. 13 shows a block diagram of one example of a mobile device, according to one aspect of the principles described herein.

FIG. 13 shows a block diagram of one example of a mobile device 115-k, according to one aspect of the principles described herein. The mobile device 115-k may be an example of one or more of the mobile devices 115 described above with reference to the previous Figures.

The mobile device 115-k of FIG. 13 may include a processor 1110-b, a memory 1115-b, a mobility parameter modification module 1320, a cell measurement module 1125-a, a handover module 1130-b, and a wireless wide area network (WWAN) radio 1135-b. Each of these components may be in communication, directly or indirectly.

The processor 1110-b may be configured to execute computer-readable program code stored by the memory 1115-b to implement one or more aspects of the mobility parameter modification module 1320, the cell measurement module 1125-a, the handover module 1130-b, and/or the wireless wide area network (WWAN) radio 1135-b. The processor 1110-b may also execute computer-readable program code stored by the memory 1115-b to implement other applications 1117-b.

The mobility parameter modification module 1320 may be configured to modify one or more mobility parameters for measurements associated with handover or cell reselection by the mobile device 115-k based on historical information 1119-b associated with mobility patterns of the mobile device 115-k. The mobility parameters may further be modified based on a current location or state of the mobile device 115-k in relation to the historical information 1119-b. Additionally or alternatively, the mobility parameter modification module 1320 may modify, based on the historical information 1119-b, a search window in which measurements of neighboring cells are to be performed (e.g., according to the likelihood of being the next cell). In additional or alternative examples, the mobility parameter modification module 1320 may modify mobility parameters for measurements of neighboring cells for different ones of the neighboring cells.

In certain examples, a serving cell of the mobile device 115-*k* (e.g., a cell associated with one or more of the base stations 105 described in other Figures of the present disclosure) may modify the mobility parameters for measurements of at least one of the identified set of the neighboring cells based on the historical information 1119-*b*, as described above. The mobile device 115-*k* may communicate with the serving cell using the WWAN radio 1135-*b*. In certain examples, the mobility parameter modification module 1320 may communicate with a server (e.g., over WWAN radio 1135-*b*) to receive the historical information 1119-*b*. Additionally or alternatively, the mobile device 115-*k* may collect and store the historical information 1119-*b* locally in the memory 1115-*b* of the mobile device 115-*k*, as shown in FIG. 13.

The historical information may include information about the mobility patterns of the mobile device 115-*k*. The mobility patterns may include, for example, a route and a schedule of the mobile device 115-*k* between a first location and a second location. Additionally or alternatively, the mobility patterns may include a location and a period of time during which the mobile device 115-*k* remains at the location. Thus, in certain examples, the historical information may include a serving cell history and/or a mobility parameter history of the mobile device 115-*k* over a predetermined period of time, as observed and stored by the server, the serving cell, and/or the mobile device 115-*k*.

The cell measurement module 1125-*a* may be configured to perform signal strength measurements on the one or more neighboring cells according to the modified mobility parameters as determined by the mobility parameter modification module 1320. For example, the cell measurement module 1125-*a* may make measurements of an identified subset of the neighboring cells and report the signal strength measurements to the serving cell. In some aspects, the modified mobility parameters may include modifying the reporting threshold for the signal strength measurements. The handover module 1130-*b* may be configured to perform a handover or reselection of the mobile device 115-*k* to a target cell in the identified subset and/or based on the modified mobility parameters measurements. In certain examples, the serving cell may select the target cell from the identified subset based on the modified signal strength measurements provided by the cell measurement module 1125-*a*. The serving cell may then indicate the selected target cell to the mobile device 115-*k* through WWAN signaling. Additionally or alternatively, the mobile device 115-*k* may perform or aid in the selection of the target cell based on the signal strength measurements for the identified subset.

In certain examples, the modified mobility parameters may be applicable to a single, several, or all of the neighboring cells. In such cases, the cell measurement module 1125-*a* may measure a signal strength associated with the applicable neighboring cell(s), and the handover module 1130-*b* may perform a handover (initiated by the mobile device 115-*k* or the serving cell) of the mobile device 115-*k* to the neighboring cell if the signal strength of the single neighboring cell is greater than a threshold level, as determined by the modified mobility parameter.

In certain examples, the mobility parameter modification module 1320 may modify a mobility parameter including a tracking area parameter for each of the neighboring cells in the set, and the subset may be selected to include each neighboring cell that has a corresponding tracking area parameter. The measurements may be restricted based on, for example, whether the neighboring cell has the same tracking area parameter.

In certain examples, the mobility parameter modification module 1320 may modify the mobility parameter including a timing associated with at least one of the neighboring cells. For example, the mobility parameter modification module 1320 may modify the measurement timing for the at least one neighbor cell based on the historical information. In some aspects, the mobility parameter modification module 1320 may modify the time duration in which the measurements for the at least one neighbor cell occurs. The timing for each neighboring cell may be modified based on the historical information 1119-*b* for the mobile device 115-*k*, that the neighboring cell will be the next cell in a mobility path of the mobile device 115-*k*, etc.

In certain examples, the mobility parameter modification module 1320 and/or the serving cell for the mobile device 115-*k* may exclude one or more of the neighboring cells from the subset selected for measurements based at least on a current speed of the mobile device 115-*k* and a signal strength of the one or more neighboring cells. For example, if the mobile device 115-*k* is traveling along a known path and momentarily passes through the coverage area of a femtocell while the subset of the neighboring cells selected for measurement is identified, the femtocell may be excluded from the subset of neighboring cells selected for measurement due to the likelihood that the mobile device 115-*k* will soon be outside the coverage area of the femtocell.

Figure 14:
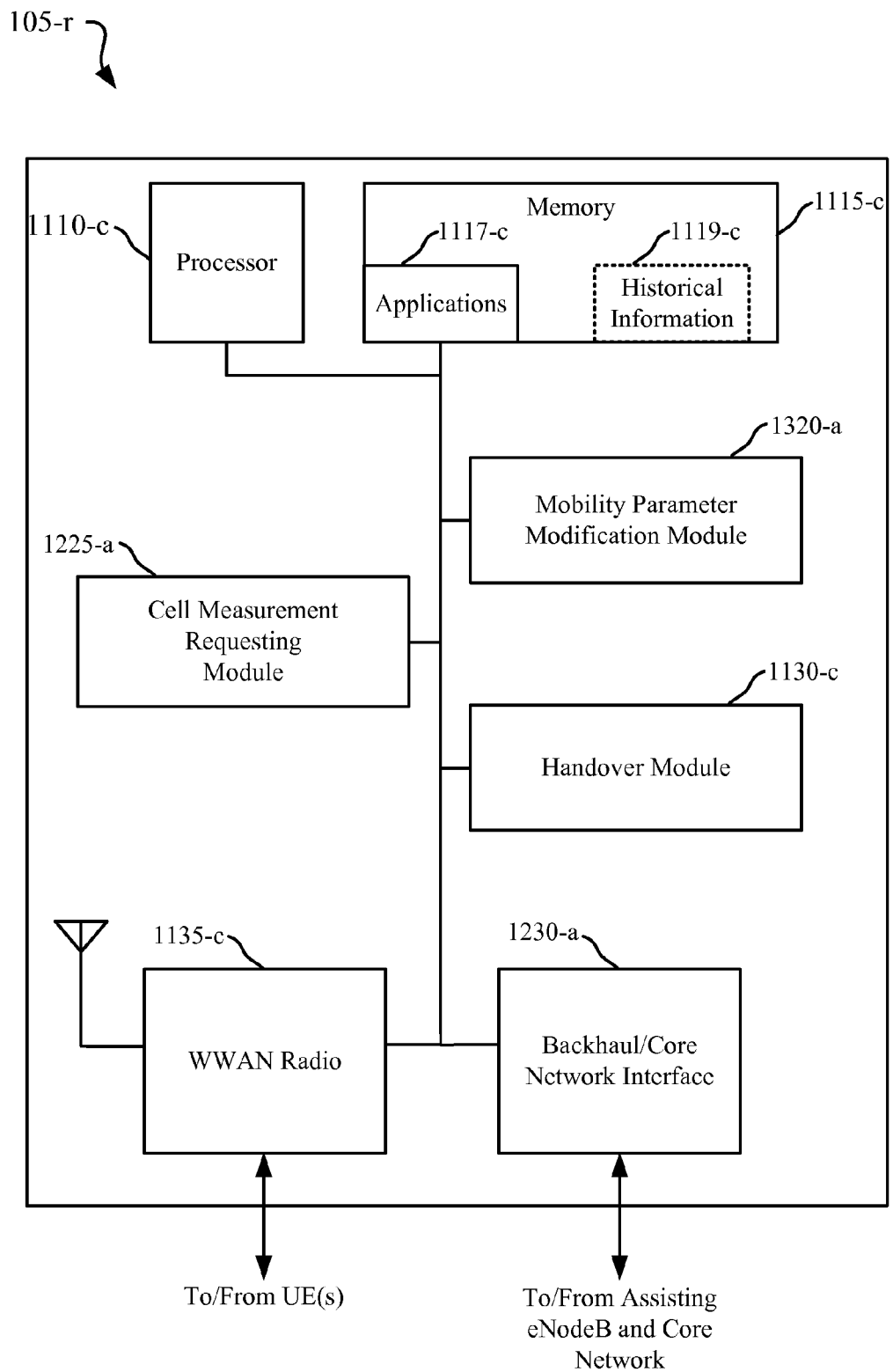
FIG. 14 shows a block diagram of one example of a base station, according to one aspect of the principles described herein.

FIG. 14 shows a block diagram of one example of a base station 105-*r*, according to one aspect of the principles described herein. The base station 105-*r* may be an example of one or more of the base stations 105 described above with reference to the previous Figures. The base station 105-*r* may be associated with a serving cell of one or more of the mobile devices 115 described above with reference to the previous Figures.

The base station 105-*r* of FIG. 14 may include a processor 1110-*c*, a memory 1115-*c*, a mobility parameter modification module 1320-*a*, a cell measurement requesting module 1225-*a*, a handover module 1130-*c*, a wireless wide area network (WWAN) radio 1135-*c*, and a backhaul/core network interface 1230-*a*. Each of these components may be in communication, directly or indirectly.

The processor 1110-*c* may be configured to execute computer-readable program code stored by the memory 1115-*c* to implement one or more aspects of the mobility parameter modification module 1320-*a*, the cell measurement requesting module 1225-*a*, the handover module 1130-*c*, the WWAN radio 1135-*c*, and/or the backhaul/core network interface 1230-*a*. The processor 1110-*c* may also execute computer-readable program code stored by the memory 1115-*c* to implement other applications 1117-*c*.

The mobility parameter modification module 1320-*a* may be configured to modify one or more mobility parameters for measurement of a set of neighboring cells by a mobile device (e.g., one or more of the mobile devices 115 described in the present disclosure) based on historical information 1119-*c* associated with mobility patterns of the mobile device. The mobility parameters may further be modified based on a current location or state of the mobile device in relation to the historical information 1119-*c*. In certain examples, the base station 105-*r* may modify the mobility parameters based on the historical information 1119-*c* and location or state of the mobile device. The base station 105-*r* may then signal (e.g., using the WWAN radio 1135-*c*) the modified mobility parameters for the neighboring cells to the mobile device. Additionally or alternatively, a separate network entity (e.g., a server or mobility management entity (MME)) may modify the mobility parameters based on the historical information 1119-*c* and location or state of the mobile device and signal (e.g., over the backhaul/core network interface 1230-*a*) the modified mobility parameters to the base station 105-*r* for forwarding to the mobile device. In still other examples, the mobile device may itself modify the mobility parameters based on the historical information 1119-*c*.

Additionally or alternatively, the mobility parameter modification module 1320-*a* may modify, based on the historical information 1119-*c*, the mobility parameters for measurements of neighboring cells (e.g., according to likelihood of being the next cell) by the mobile device. In additional or alternative examples, the mobility parameter modification module 1320-*a* may modify a mobility parameter including a timing window in which measurements of neighboring cells are performed.

In examples where the base station 105-*r* modifies the mobility parameters for measurement of neighboring cells by the mobile device, the base station 105-*r* may collect and store the historical information 1119-*c* locally in the memory 1115-*c* of the base station 105-*r*, as shown in FIG. 14.

The historical information may include information about the mobility patterns of the mobile device. The mobility patterns may include, for example, a route and a schedule of the mobile device between a first location and a second location. Additionally or alternatively, the mobility patterns may include a location and a period of time during which the mobile device remains at the location. Thus, in certain examples, the historical information may include a serving cell history and/or a mobility parameter history of the mobile device over a predetermined period of time, as collected by a network server, the base station 105-*r*, and/or the mobile device.

The cell measurement requesting module 1225-*a* may be configured to instruct the mobile device to perform signal strength measurements on the one or more neighboring cells according to the modified mobility parameters and report the signal strength measurements to the base station 105-*r*. The handover module 1130-*c* may be configured to perform a handover or reselection of the mobile device to a target cell based on the reported measurements according to the modified mobility parameters. In certain examples, the handover module 1130-*c* of the base station 105-*r* may modify the mobility parameter for a selected target cell from the identified subset based on the signal strength measurements at the mobile device provided in response to the request made by the cell measurement requesting module 1225-*a*. The handover module 1130-*c* of the base station 105-*r* may indicate the selected target cell to the mobile device through WWAN signaling. Additionally or alternatively, the mobile device may perform or aid in the selection of the target cell based on the signal strength measurements for the identified subset.

In certain examples, the modified mobility parameters may be applicable to a single, several, or all of the neighboring cells. In such cases, the cell measurement requesting module 1225-*a* may instruct the mobile device to measure a signal strength associated with the applicable neighboring cell(s), and the handover module 1130-*c* may coordinate with the mobile device to perform a handover (initiated by the mobile device or the serving cell) of the mobile device to the neighboring cell if the signal strength of the single neighboring cell is greater than a threshold level, as determined by the modified mobility parameter.

In certain examples, the mobility parameter modification module 1320-*a* may modify a mobility parameter including a tracking area parameter for each of the neighboring cells in the set, and the subset may be selected to include each neighboring cell that has a corresponding tracking area parameter. The measurements may be restricted based on, for example, whether the neighboring cell has the same tracking area parameter.

In certain examples, the mobility parameter modification module 1320-*a* may modify the mobility parameter including a timing associated with at least one of the neighboring cells. The mobility parameter modification module 1320-*a* may modify the measurement timing for the at least one neighbor cell based on the historical information. The timing for each neighboring cell may be modified based on the historical information 1119-*c* for the mobile device, that the neighboring cell will be the next cell in a mobility path of the mobile device, etc.

In certain examples, the mobility parameter modification module 1320-*a* and/or the serving cell for the mobile device may exclude one or more of the neighboring cells from the subset selected for measurements based at least on a current speed of the mobile device and a signal strength of the one or more neighboring cells. For example, if the mobile device is traveling along a known path and momentarily passes through the coverage area of a femtocell while the subset of the neighboring cells selected for measurement is identified, the femtocell may be excluded from the subset of neighboring cells selected for measurement due to the likelihood that the mobile device will soon be outside the coverage area of the femtocell.

Figure 15:
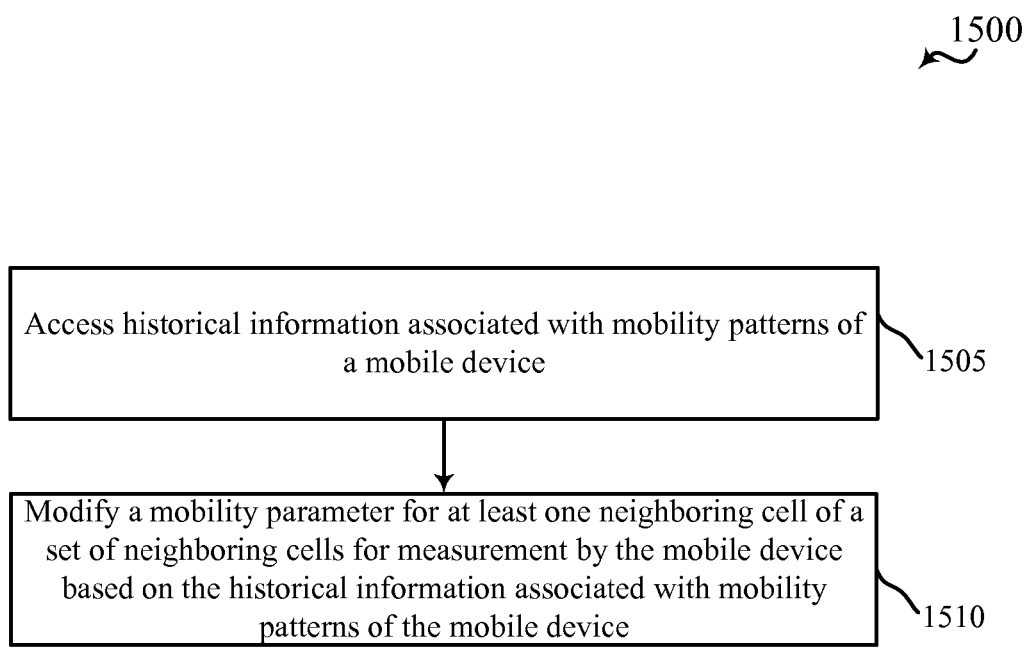
FIG. 15 shows a flowchart diagram of a method for managing wireless communications, according to one aspect of the principles described herein.

FIG. 15 shows a flowchart diagram of a method 1500 for managing wireless communications, in accordance with an aspect of the present disclosure. Specifically, FIG. 15 illustrates a method 1500 of improving network and/or mobile device performance based on learning and predicting the behavior of a mobile device. The method 1500 may be implemented in one or more of the wireless communications systems 100, 200, 300, 400, 500, 600, 700, 800, 900, 1000 described above with respect to the previous Figures. In particular, the method 1500 may be performed by one or more of the base stations 105, mobile devices 115, or other nodes described above with reference to the previous Figures.

At block 1505, historical information associated with mobility patterns of a mobile device may be accessed. The historical information may be accessed by collecting and storing the historical information and/or by receiving the historical information from another device. At block 1510, a mobility parameter is modified for at least one neighboring cell of a set of neighboring cells for measurement by the mobile device based on the historical information associated with mobility patterns of the mobile device. The mobility parameters may be modified for measurement based on the historical information. Exemplary mobility parameters that may be modified include, but are not limited to, a handover or cell reselection threshold value, a search window, a timing, and the like, for at least one of the neighboring cells. In some aspects, different mobility parameters may be modified for different ones of the neighboring cells.

Figure 16:
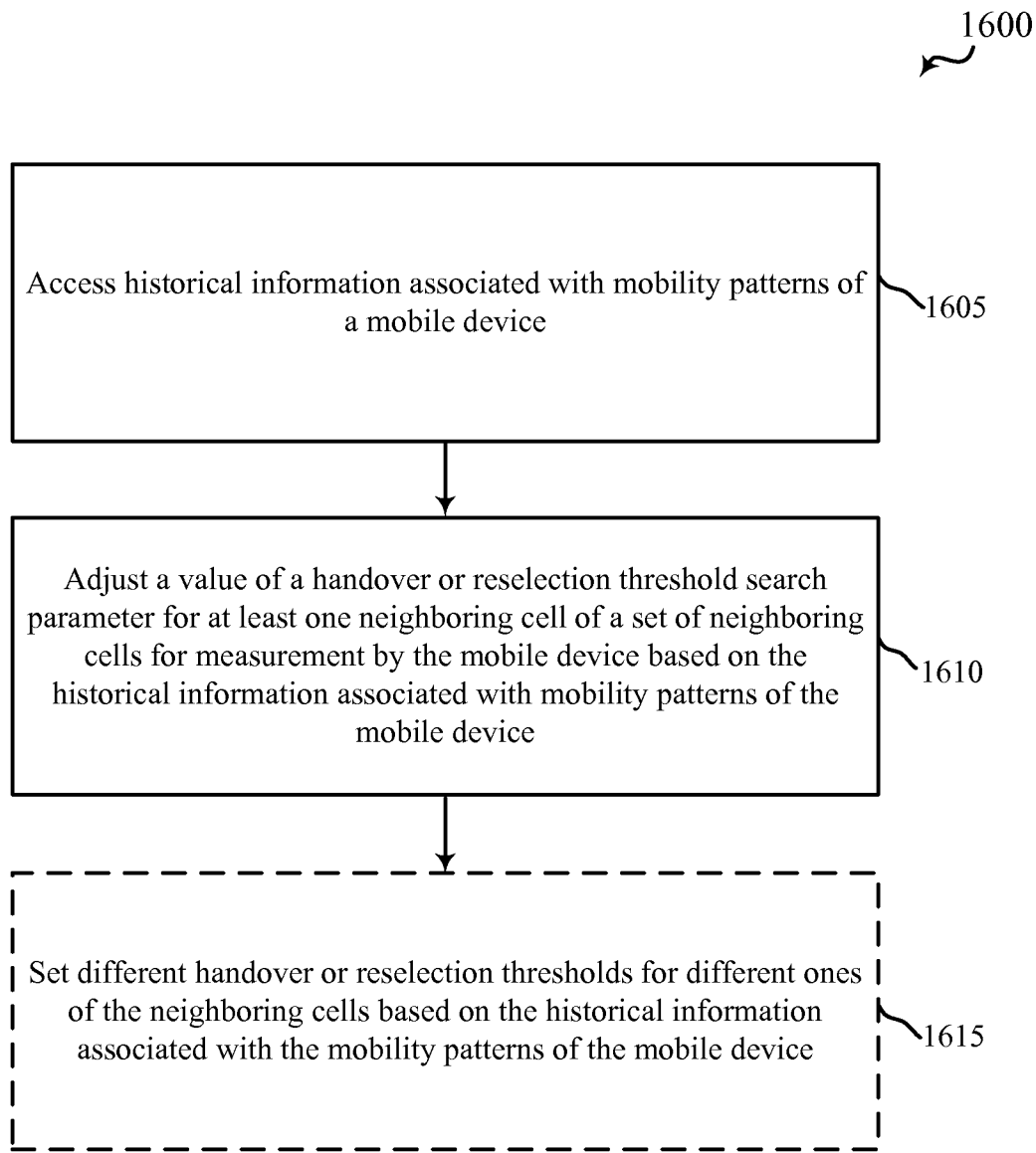
FIG. 16 shows a flowchart diagram of a method for managing wireless communications, according to one aspect of the principles described herein.

FIG. 16 shows a flowchart diagram of a method 1600 for managing wireless communications, in accordance with an aspect of the present disclosure. Specifically, FIG. 16 illustrates a method 1600 of improving network and/or mobile device performance based on learning and predicting the behavior of a mobile device. The method 1600 may be implemented in one or more of the wireless communications systems 100, 200, 300, 400, 500, 600, 700, 800, 900, 1000 described above with respect to the previous Figures. In particular, the method 1600 may be performed by one or more of the base stations 105 or other network devices described above with reference to the previous Figures.

At block 1605, historical information associated with mobility patterns of a mobile device may be accessed. The historical information may include a mobility parameter history for the mobile device. At block 1610, a value is adjusted for a handover or reselection threshold mobility parameter for at least one neighboring cell of a set of neighboring cells for measurement by the mobile device based on the historical information associated with mobility patterns of the mobile device. The handover or reselection threshold value may be adjusted based on a location of the mobile device and/or a neighboring cell list maintained by the mobile device and/or the current serving cell of the mobile device.

At block 1615, different handover or reselection thresholds may be optionally set for different ones of the neighboring cells based on the historical information associated with the mobility patterns of the mobile device. In some aspects, the handover or reselection threshold value for a preferred target cell may be reduced to ensure handover to the preferred target cell where a handover or reselection threshold value for a different cell (e.g., femtocell) may be increased to avoid performing a handover to the different cell. In other aspects, the handover or reselection threshold value for a serving cell and a preferred target cell may be lowered to ensure handover to the preferred target whereas the handover or reselection threshold value for other neighboring cells may be raised to avoid reselection.

Figure 17:
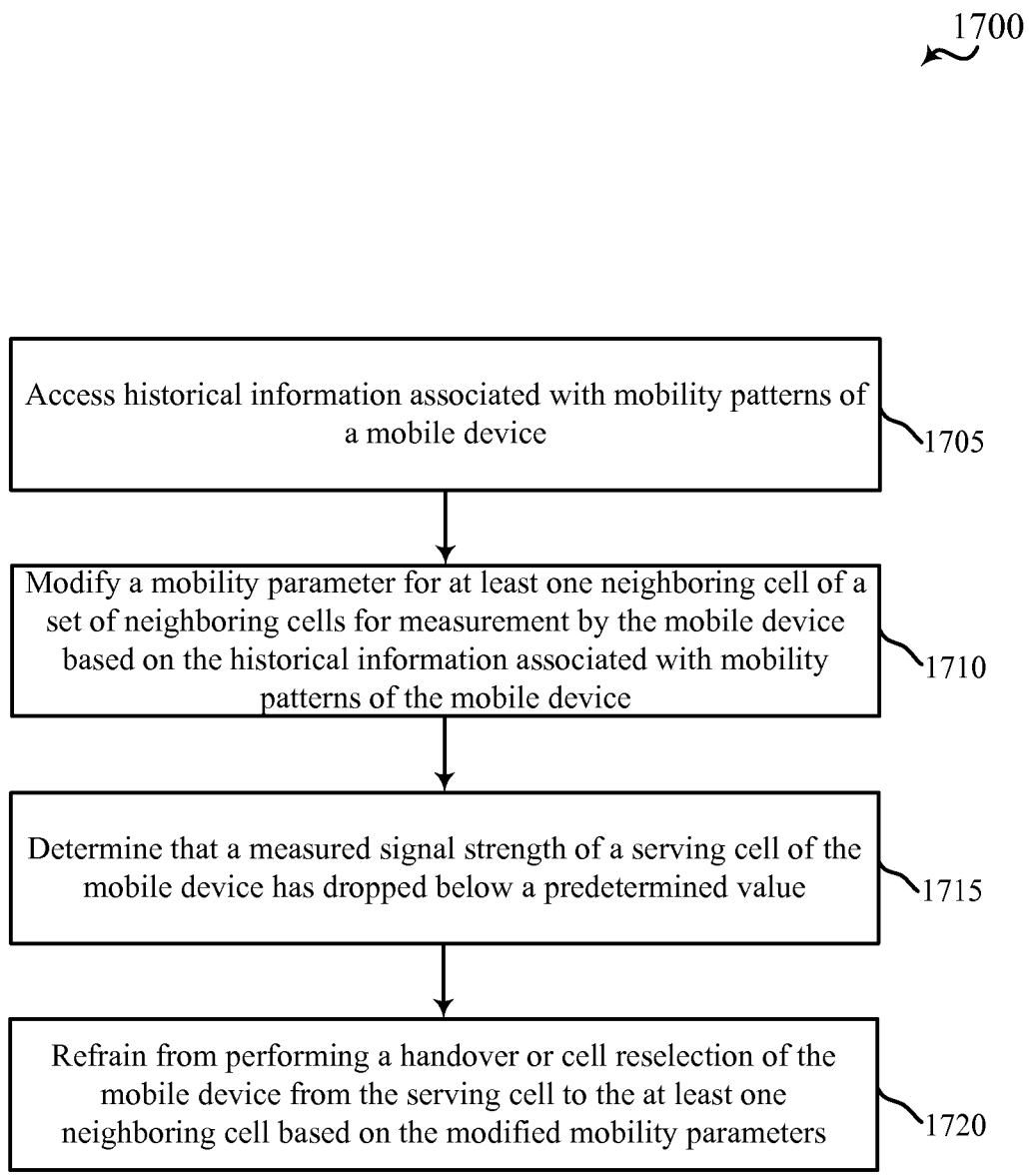
FIG. 17 shows a flowchart diagram of a method for managing wireless communications, according to one aspect of the principles described herein.

FIG. 17 shows a flowchart diagram of a method 1700 for managing wireless communications, in accordance with an aspect of the present disclosure. Specifically, FIG. 17 illustrates a method 1700 of improving network and/or mobile device performance based on learning and predicting the behavior of a mobile device. The method 1700 may be implemented in one or more of the wireless communications systems 100, 200, 300, 400, 500, 600, 700, 800, 900, 1000 described above with respect to the previous Figures. In particular, the method 1700 may be performed by one or more of the mobile devices 115 or other network devices described above with reference to the previous Figures.

At block 1705, historical information associated with mobility patterns of a mobile device may be accessed. The historical information may be accessed by collecting and storing the historical information and/or by receiving the historical information from another device. At block 1710, a mobility parameter is modified for at least one neighboring cell of a set of neighboring cells for measurement by the mobile device based on the historical information associated with mobility patterns of the mobile device. The mobility parameters may be modified for measurement based on the historical information. Exemplary mobility parameters that may be modified include, but are not limited to, a handover or cell reselection threshold value, a search window, a timing, and the like, for at least one of the neighboring cells. In some aspects, different mobility parameters may be modified for different ones of the neighboring cells.

At block 1715, it may be determined that a measured signal strength of a serving cell of the mobile device has dropped below a predetermined value. It may be determined that the drop in the measured signal strength of a serving cell of the mobile device has occurred for a predetermined period of time. At block 1720, the mobile device and/or the serving cell may refrain from performing a handover or cell reselection of the mobile device from the serving cell to the at least one neighboring cell based on the modified mobility parameters. For instance, the mobile device may, based on the historical information associated with the mobility patterns of the mobile device, determine that the mobile device is approaching a preferred target cell along its current route and, therefore, may reduce the mobility parameter associated with the signal strength measurement for the serving cell to permit the mobile device to continue to be serviced by the serving cell. As such, the mobile device may avoid a short duration handover to a neighbor cell having a suitable signal strength but otherwise not preferable (e.g., a femtocell having a small coverage area).

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-Ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing wireless communications, comprising:
   accessing, by a mobile device, historical information associated with mobility patterns of the mobile device, wherein the mobility patterns of the mobile device comprise a route previously travelled by the mobile device;
   predicting, by the mobile device, a behavior of the mobile device based on the historical information associated with the mobility patterns of the mobile device;
   determining, by the mobile device, that a measured signal strength of a serving cell of the mobile device has dropped below a predetermined value;
   modifying, by the mobile device, a mobility parameter for at least one neighboring cell of a set of neighboring cells for measurement by the mobile device based on the predicted behavior of the mobile device; and
   refraining from performing a handover or cell reselection of the mobile device from the serving cell to the at least one neighboring cell based on the modified mobility parameter.

2. The method of claim 1, wherein the mobility parameter comprises a handover or reselection threshold associated with the at least one neighboring cell;
   and wherein modifying the mobility parameter comprises adjusting a value of the handover or reselection threshold.

3. The method of claim 2, wherein modifying the mobility parameter further comprises:
   setting different handover or reselection thresholds for different ones of the neighboring cells.

4. The method of claim 1, wherein the mobility parameter comprises a search window size associated with a handover or a reselection; and wherein modifying the mobility parameter comprises adjusting the search window size.

5. The method of claim 1, wherein the mobility parameter comprises a timing associated with the at least one neighboring cell; and wherein modifying the mobility parameter comprises adjusting the timing associated with the at least one neighboring cell.

6. The method of claim 1, wherein the mobility parameter comprises a cell tracking area parameter, and wherein modifying the mobility parameter comprises restricting the measurement of the neighboring cells to a subset of a set of cell tracking areas associated with the neighboring cells.

7. The method of claim 1, further comprising:
   selecting the at least one neighboring cell for measurement based on the modified mobility parameter.

8. The method of claim 1, further comprising:
   receiving the historical information from a server, the historical information comprising a mobility parameter history for at least one serving cell of the mobile device.

9. The method of claim 1, wherein the historical information comprises a mobility parameter history for the neighboring cells of the mobile device.

10. The method of claim 1, further comprising:
    collecting and storing the historical information at the mobile device over a predetermined period of time.

11. The method of claim 1, further comprising:
    performing a handover or cell reselection of the mobile device to the at least one neighboring cell based on the modified mobility parameter.

12. An apparatus for managing wireless communications, comprising:
    a processor; and
    a memory in electronic communication with the processor, the memory embodying instructions, the instructions being executable by the processor to:
    access, by a mobile device, historical information associated with mobility patterns of the mobile device, wherein the mobility patterns of the mobile device comprise a route previously travelled by the mobile device;
    predict, by the mobile device, a behavior of the mobile device based on the historical information associated with the mobility patterns of the mobile device;
    determine, by the mobile device, that a measured signal strength of a serving cell of the mobile device has dropped below a predetermined value;
    modify, by the mobile device, a mobility parameter for at least one neighboring cell of a set of neighboring cells for measurement by the mobile device based on the predicted behavior of the mobile device; and
    refrain from performing a handover or cell reselection of the mobile device from the serving cell to the at least one neighboring cell based on the modified mobility parameter.

13. The apparatus of claim 12, wherein the mobility parameter comprises a handover or reselection threshold associated with the at least one neighboring cell; and wherein the instructions to modify the mobility parameter comprise instructions executable to adjust a value of the handover or reselection threshold.

14. The apparatus of claim 13, wherein the instructions to modify the mobility parameter comprise instructions executable to:
set different handover or reselection thresholds for different ones of the neighboring cells.

15. The apparatus of claim 12, wherein the mobility parameter comprises a search window size associated with a handover or a reselection; and wherein the instructions to modify the mobility parameter comprise instructions executable to adjust the search window size.

16. The apparatus of claim 12, wherein the mobility parameter comprises a timing associated with the at least one neighboring cell; and wherein the instructions to modify the mobility parameter comprise instructions executable to adjust the timing associated with the at least one neighboring cell.

17. The apparatus of claim 12, wherein the mobility parameter comprises a cell tracking area parameter, and wherein the instructions to modify the mobility parameter comprise instructions executable to restrict the measurement of the neighboring cells to a subset of a set of cell tracking areas associated with the neighboring cells.

18. The apparatus of claim 12, further comprising instructions executable to:
select the at least one neighboring cell for measurement based on the modified mobility parameter.

19. The apparatus of claim 12, further comprising instructions executable to:
receive the historical information from a server, the historical information comprising a mobility parameter history for at least one serving cell of the mobile device.

20. The apparatus of claim 12, wherein the historical information comprises a mobility parameter history for the neighboring cells of the mobile device.

21. The apparatus of claim 12, further comprising instructions executable to:
collect and store the historical information at the mobile device over a predetermined period of time.

22. The apparatus of claim 12, further comprising instructions executable to:
perform a handover or cell reselection of the mobile device to the at least one neighboring cell based on the modified mobility parameter.

23. An apparatus for managing wireless communications, comprising:
means for accessing, by a mobile device, historical information associated with mobility patterns of the mobile device, wherein the mobility patterns of the mobile device comprise a route previously travelled by the mobile device;
means for predicting, by the mobile device, a behavior of the mobile device based on the historical information associated with the mobility patterns of the mobile device;
means for determining, by the mobile device, that a measured signal strength of a serving cell of the mobile device has dropped below a predetermined value;
means for modifying, by the mobile device, a mobility parameter for at least one neighboring cell of a set of neighboring cells for measurement by the mobile device based on the predicted behavior of the mobile device; and
means for refraining from performing a handover or cell reselection of the mobile device from the serving cell to the at least one neighboring cell based on the modified mobility parameter.

24. The apparatus of claim 23, wherein the mobility parameter comprises a handover or reselection threshold associated with the at least one neighboring cell;
and wherein the means for modifying the mobility parameter comprises means for adjusting a value of the handover or reselection threshold.

25. The apparatus of claim 23, wherein the mobility parameter comprises a cell tracking area parameter, and wherein the means for modifying the mobility parameter comprises means for restricting the measurement of the neighboring cells to a subset of a set of cell tracking areas associated with the neighboring cells.

26. A computer program product for managing wireless communications, the computer program product comprising a non-transitory computer-readable storage medium comprising instructions executable by a processor to:
access, by a mobile device, historical information associated with mobility patterns of the mobile device, wherein the mobility patterns of the mobile device comprise a route previously travelled by the mobile device;
predict, by the mobile device, a behavior of the mobile device based on the historical information associated with the mobility patterns of the mobile device;
determine, by the mobile device, that a measured signal strength of a serving cell of the mobile device has dropped below a predetermined value;
modify, by the mobile device, a mobility parameter for at least one neighboring cell of a set of neighboring cells for measurement by the mobile device based on the predicted behavior of the mobile device; and
refrain from performing a handover or cell reselection of the mobile device from the serving cell to the at least one neighboring cell based on the modified mobility parameter.

* * * * *